United States Patent [19]

Killian et al.

[11] Patent Number: 5,568,630
[45] Date of Patent: Oct. 22, 1996

[54] BACKWARD-COMPATIBLE COMPUTER ARCHITECTURE WITH EXTENDED WORD SIZE AND ADDRESS SPACE

[75] Inventors: Earl A. Killian; Thomas J. Riordan, both of Los Altos; Danny L. Freitas, San Jose; Ashish B. Dixit, Union City; John L. Hennessy, Atherton, all of Calif.

[73] Assignee: Silicon Graphics, Inc., Mountain View, Calif.

[21] Appl. No.: 391,946

[22] Filed: Feb. 21, 1995

Related U.S. Application Data

[62] Division of Ser. No. 223,388, Apr. 5, 1994, which is a continuation of Ser. No. 668,275, Mar. 11, 1991, abandoned.

[51] Int. Cl.$^6$ .................................................. G06F 12/06
[52] U.S. Cl. ........................ 395/375; 395/413; 395/800; 364/DIG. 1
[58] Field of Search ................................ 395/375, 800, 395/413, 402

[56] References Cited

U.S. PATENT DOCUMENTS

| | | |
|---|---|---|
| 3,828,316 | 8/1974 | Card et al. . |
| 4,161,784 | 7/1979 | Cushing et al. . |
| 4,206,503 | 6/1980 | Woods et al. . |
| 4,366,548 | 12/1982 | Kregness et al. . |
| 4,386,399 | 5/1983 | Rasala et al. . |
| 4,388,685 | 6/1983 | Kotok et al. ............................ 395/402 |
| 4,398,243 | 8/1983 | Holberger et al. . |
| 4,409,655 | 10/1983 | Wallach et al. . |
| 4,434,459 | 2/1984 | Holland et al. . |
| 4,507,731 | 3/1985 | Morrison ............................... 395/411 |
| 4,608,634 | 8/1986 | Caudel et al. . |
| 4,675,809 | 6/1987 | Omoda et al. . |
| 4,868,740 | 9/1989 | Kamigasa et al. ....................... 395/402 |
| 4,890,251 | 12/1989 | Nitta et al. . |
| 4,992,934 | 2/1991 | Portanova et al. ....................... 395/375 |
| 5,201,056 | 4/1993 | Daniel et al. ........................... 395/800 |

FOREIGN PATENT DOCUMENTS

| | | |
|---|---|---|
| 0039227 | 11/1981 | European Pat. Off. . |
| 2201271 | 8/1988 | United Kingdom . |
| WO88/02148 | 3/1988 | WIPO . |

OTHER PUBLICATIONS

J. M. Angiulli et al., "Performance Enhancement for the AH, CH, MH and SH Instructions", *IBM Technical Disclosure Bulletin*, vol. 23, No. 3, Aug. 1980, pp. 1136–1138.

R. Fosheim et al., "Single–board computer merges 8–, 16–bit performance", *Mini–Micro Systems*, Aug. 1984, p. 166.

IBM Technical Disclosure Bulletin, vol. 29, No. 4, Sep. 1986, pp. 1494–1501.

(List continued on next page.)

*Primary Examiner*—William M. Treat

[57] ABSTRACT

A technique for extending the data word size and the virtual address space of a pre-existing architecture so that hardware for the extended architecture also supports the pre-existing architecture. Extension of the data word size from m bits to N bits entails widening the machine registers and data paths from m bits to N bits and sign-extending entities of m or fewer bits to N bits when they are loaded into registers. Some of the m-bit instructions, when operating on N-bit sign-extended versions of m-bit entities, produce an N-bit result that may not correspond to the correct m-bit result, sign-extended to N bits. For these instructions compatibility requires that the instructions be further defined to guarantee a sign-extended result. This means that separate N-bit instructions corresponding to these m-bit instructions are needed. The support for up to an N-bit virtual address space is provided in part by widening the virtual address data paths. The extended architecture supports the m-bit architecture's addressing with minimal additional hardware. This is made possible by storing m-bit addresses as N-bit entities in sign-extended form and requiring that the results of address computations on these entities be in sign-extended form.

14 Claims, 9 Drawing Sheets

OTHER PUBLICATIONS

John L. Hennessy, "VLSI Processor Architecture," IEEE Transactions on Computers, vol. C–33, No. 12, Dec. 1984, pp. 1221–1246.

Patent Abstracts of Japan, vol. 7, No. 198 (P–220) (1343), Sep. 2, 1983.

"MC68030 Enhanced 32–Bit Microprocessor User's Manual", Second Edition, 1989. Motorola, Inc. Operations detailed in Chapter 3 performing sign extension.

John Mick et al., "Bit–Slicer Microprocessor Design", pp. 138–159 and pp. 290, 295, 296; 1980.

"i486™ Microprocessor Programmer's Reference Manual", Chapters 14 and 15; 1989, Intel Corporation.

"IAPX 86/88, 186/188 User's Manual", Hardware Reference, Chapter 3; 1985, Intel Corporation.

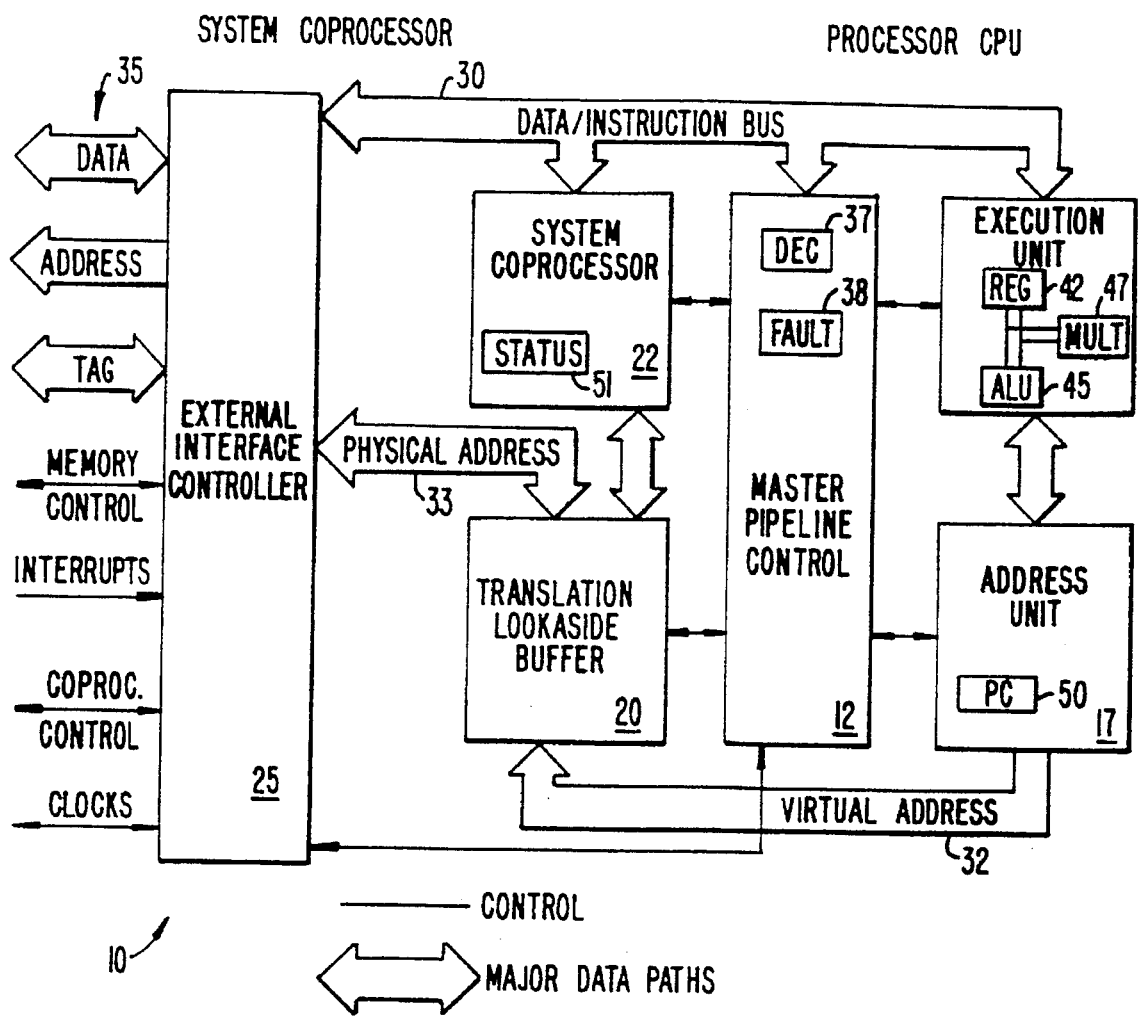
FIG. 1. (PRIOR ART AND NEW)
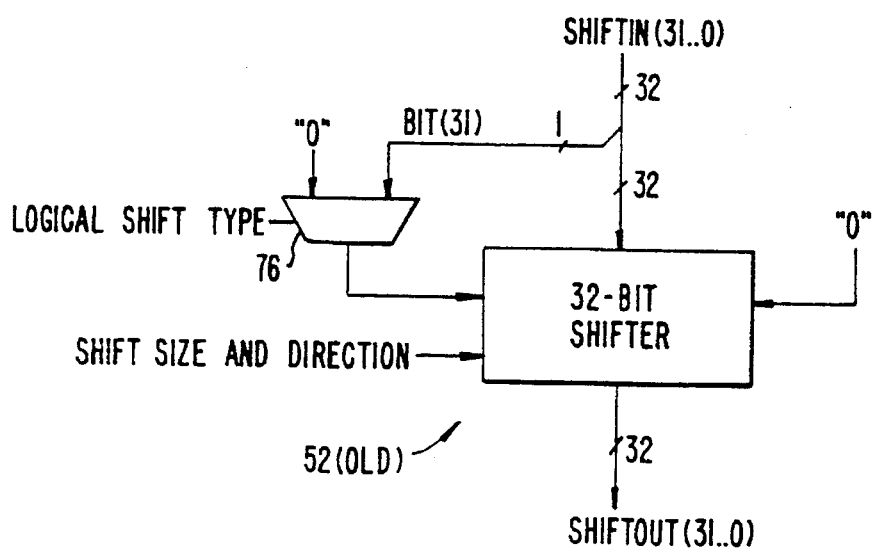
FIG. 2B. (PRIOR ART)

64-BIT KERNEL

| Address | Region |
|---|---|
| $2^{64}-1$ | KERNEL VIRTUAL ADDRESS SPACE MAPPED, 0.5 GB |
| $2^{64}-2^{32}+0xe0000000$ | |
| $2^{64}-2^{32}+0xdfffffff$ | SUPERVISOR MIPS II VIRTUAL ADDRESS SPACE MAPPED, 0.5 GB |
| $2^{64}-2^{32}+0xc0000000$ | |
| $2^{64}-2^{32}+0xbfffffff$ | UNCACHED KERNEL PHYSICAL ADDRESS SPACE (KSEG1) UNMAPPED, 0.5 GB |
| $2^{64}-2^{32}+0xa0000000$ | |
| $2^{64}-2^{32}+0x9fffffff$ | CACHED KERNEL PHYSICAL ADDRESS SPACE (KSEG0) UNMAPPED, 0.5 GB |
| $2^{64}-2^{32}+0x80000000$ | |
| $2^{64}-2^{32}+0x7fffffff$ | ADDRESS ERROR |
| $3\times2^{62}+2^{VSIZE}-2^{31}+0$ | |
| $3\times2^{62}+2^{VSIZE}-2^{31}-1$ | KERNEL VIRTUAL ADDRESS SPACE MAPPED |
| $3\times2^{62}+0$ | |
| $3\times2^{62}-1$ | KERNEL PHYSICAL ADDRESS SPACES UNMAPPED |
| $2\times2^{62}+0$ | |
| $2\times2^{62}-1$ | ADDRESS ERROR |
| $1\times2^{62}+2^{VSIZE}+0$ | |
| $1\times2^{62}+2^{VSIZE}-1$ | SUPERVISOR MIPS III VIRTUAL ADDRESS SPACE MAPPED |
| $1\times2^{62}+0$ | |
| $1\times2^{62}-1$ | ADDRESS ERROR |
| $2^{VSIZE}+0$ | |
| $2^{VSIZE}-1$ | USER VIRTUAL ADDRESS SPACE MAPPED |
| 0 | |

*FIG. 5C.*

BACKWARD-COMPATIBLE COMPUTER ARCHITECTURE WITH EXTENDED WORD SIZE AND ADDRESS SPACE

This is a Division of application Ser. No. 08/223,388 filed Apr. 5, 1994 which is a continuation of 07/668,275 filed Mar. 11, 1991, now abandoned.

BACKGROUND OF THE INVENTION

The invention relates generally to computer architectures and more specifically to a technique for extending an instruction set architecture to have a larger word size and address space.

The largest programs have been growing their address space needs at approximately one-half to one bit per year. Very soon, a 32-bit address space will be inadequate for these programs, just as 16-bit addressing became inadequate in the 1970's. An example of this phenomenon was the IBM/370 which implemented 31-bit addressing because the 24-bit addressing on the IBM/360 was found to be inadequate.

Computer manufacturers have tended to make the transition to a larger address space in their new computers by moving to new instruction sets. Moving to a new instruction set is a step having potentially disastrous consequences, both for the user and the manufacturer. From the user's point of view, this means that programs written for the old machine won't run on the new machine. The user who has made a substantial investment in software is faced with the equally unpleasant prospects of either paying to convert or replace the software or foregoing the advantages of the various advances embodied in the new machine. From the manufacturer's point of view, such a move is likely to result in user resentment and initially slow sales of the new machine.

Some designers have used a technique called segmentation to extend their instruction sets. A number of 32-bit architectures have already defined a segmentation scheme for extending their address spaces. Examples are IBM-370 (ESA mode), IBM POWER and HP Precision.

While segmentation has been widely used, as for example on the Intel 80286 microprocessor, it has been less than satisfactory. With few exceptions, such as the Multics system on GE-Honeywell hardware, segmentation has proved to be inefficient and programmer visible. Full addresses become multi-word objects, which require multiple instructions and/or cycles to access and compute with. Even then, most segmentation schemes did not allow access to a single data object larger than the segment size, which is one of the primary uses for larger address space in the first place.

Another technique that has been used is to implement both the old (e.g. 16-bit) architecture and a new (e.g. 32-bit) architecture on the same hardware. For example, the DEC VAX 11/780 had a mode where it could execute PDP-11 programs, with some limitations. This technique is primarily applicable to microcoded implementations, where the old architecture is simply implemented as additional microcode. In hardwired implementations, the designer may be forced to implement essentially two CPUs, or at least a much more complex one, whose complexity may harm performance significantly. Either approach is likely to consume significant chip die area, which is an important consideration for single-chip implementations.

In any event, the compatibility mode can be costly, especially if the new and old architectures are different in ways beyond address size. This makes the compatibility mode excess baggage to carried along and later dropped. It is noted that later members of the VAX family did not support PDP-11 emulation.

SUMMARY OF THE INVENTION

The present invention provides efficient techniques for extending a pre-existing architecture in a manner that hardware for the extended architecture also supports the pre-existing architecture. This backward compatibility requires a minimal amount of additional hardware and is achieved with minimal penalty in operating speed. In addition, the programming model for the extended architecture is a simple extension, not a radical change requiring massive software redesign.

The data word size for integer operations is extended from m bits to N bits by widening the machine registers and data paths from m bits to N bits and sign-extending entities of m or fewer bits to N bits when they are loaded into registers. In this context, the term "sign-extending" means writing the most significant bit (the sign bit) of the m-bit entity into the (N-m) most significant bit positions (otherwise undefined) of the N-bit container.

A first subset of the extended architecture instruction set includes the instructions from the previous architecture. These instructions, called m-bit instructions, are redefined to operate on N-bit entities, which may be N-bit sign-extended versions of m-bit (or smaller) entities. For compatibility, the m-bit instructions, when operating on N-bit sign-extended versions of m-bit entities, must produce an N-bit result that is the N-bit sign-extended version of the correct m-bit result.

A second subset includes instructions that are not defined in the previous architecture. These instructions, called N-bit instructions, operate on N-bit entities that are generally not sign-extended versions of m-bit entities. Whether a separate N-bit instruction is required depends on the operation of the corresponding m-bit instruction on sign-extended entities and entities that are not sign-extended.

Some of the m-bit instructions, such as logical operations, when operating on N-bit sign-extended versions of m-bit entities, naturally produce an N-bit result that corresponds to the correct m-bit result, sign-extended to N bits. Thus, compatibility does not require further definition of these instructions, and they operate correctly on N-bit entities that are not sign-extended. Therefore there is no need to provide separate N-bit instructions corresponding to these m-bit instructions.

The situation is different for other m-bit instructions, such as some shift instructions. When these instructions operate on N-bit sign-extended versions of m-bit entities, the N-bit result may not correspond to the correct m-bit result, sign-extended to N bits. For these instructions that do not naturally guarantee a sign-extended result, compatibility requires that the instructions be further defined to guarantee a sign-extended result. This means that the instructions tend not to produce the correct result for N-bit operands that are not sign-extended. Accordingly, separate N-bit instructions corresponding to these m-bit instructions are needed.

The addition operation is one of the instructions that does not guarantee a sign-extended result, and therefore requires extra circuitry to sign-extend the m-bit portion of the result. Unfortunately, addition tends to set the lower limit on the cycle time. Thus, performing sign-extension for every addition operation would require either a longer cycle time or that additions be performed in two cycles. According to one aspect of the invention, sign-extension for addition is performed only when needed, which is when m-bit two's complement overflow is detected. In the context of a pipelined implementation, with one instruction per cycle, this is accomplished by stalling the pipeline, performing the sign-extension, and inserting the correct value into the pipeline during the pipeline restart sequence.

The extended architecture performs address translation and error checking on various portions of an N-bit virtual address field, including portions above bit(m−1). The previous architecture's m-bit addresses are accommodated by providing the value of the sign bit (bit(m−1)) for all the extra high order bits needed by the translation and checking mechanism. In a specific implementation, the N-bit addressing and m-bit addressing share common address generation circuitry as well. In this implementation, the extended architecture supports the m-bit architecture's addressing by generating and storing m-bit addresses as N-bit entities in sign-extended form and requiring that the results of address computations on these entities be in sign-extended form.

The support for an expanded virtual address space is provided in part by widening the virtual address data paths, including a data address adder, a branch adder, and the program counter (PC) to N bits. In one embodiment, the N-bit virtual space is divided into a number of regions differentiated by the high order virtual address bits. For example, in a particular embodiment where N=64 and m=32, virtual address bits(63..62), designated VA(63..62), define four regions, starting at addresses 0, $2^{62}$, $2 \times 2^{62}$, and $3 \times 2^{62}$. The extended architecture provides a number of flat virtual subspaces of up to $2^{VSIZE}$ bytes where VSIZE depends on the implementation. In the particular embodiment, VSIZE is constrained to the range 36 to 62 inclusive.

Depending on whether the machine is in user mode, supervisor mode, or kernel mode, certain portions of these regions are available. User mode can address a flat space of $2^{VSIZE}$ bytes starting at address 0. VA(61..VSIZE) are not translated by the TLB and an address error results if VA(63..VSIZE) are not all 0's. Supervisor mode can address the user mode space, a $2^{VSIZE}$-byte space starting at address $2^{62}$, and a $2^{29}$-byte space near the top of the fourth region. Kernel mode can address the spaces in the first and second regions, a number of unmapped spaces in the third region, a $(2^{VSIZE}-2^{31})$-byte space starting at address $3 \times 2^{62}$ and a $2^{31}$-byte space at the top of the fourth region. The $2^{31}$-byte spaces at the top and bottom of the $2^{64}$-byte space are referred to as the compatibility spaces since their addresses are in the form of 32-bit addresses, sign-extended to 64-bits, and are thus accessible to 32-bit addressing.

In a particular implementation, the previous architecture allowed valid user addresses (MSB=0) to result from two's complement overflow. In order to handle this special case in the extended architecture it is necessary to provide an address mode in the machine's status register to specify whether the machine is running an m-bit program (i.e., one written for the previous architecture) or an N-bit program (i.e., one written for the extended architecture). In m-bit user mode, it is necessary to sign-extend the address when two's complement overflow occurs.

A straightforward approach for the m-bit mode is to provide sign-extension hardware in the virtual address path to guarantee a sign-extended output in the event of m-bit two's complement overflow. However, where timing constraints militate against such sign-extension, it suffices to force the (N−m) most significant bits to zero. Accordingly, in one embodiment, zeroing circuitry is provided in the path to the address translation unit. This circuitry is invoked for m-bit user mode while the most significant (N−m) bits are passed unchanged in m-bit kernel mode and N-bit mode.

The use of the sign-extension property provides an elegant way to extend the data word size and the virtual address size without an undue amount of extra hardware to support the prior architecture.

The use of VSIZE-bit virtual addressing with error exceptions has two main advantages. First, it allows the virtual address spaces to grow gracefully in future implementations while only requiring that the TLB for a given processor be as large as needed for the existing VSIZE. Second, since the use of the unmapped virtual address bits for other purposes is forbidden, programs written for a processor with a certain VSIZE will run on a later processor with a larger VSIZE.

A further understanding of the nature and advantages of the present invention may be realized by reference to the remaining portions of the specification and the drawings.

BRIEF DESCRIPTION OF THE DRAWINGS

FIG. 1 is a block diagram of a processor incorporating either the prior art architecture of the extended architecture of the present invention;

FIG. 2B is an expanded block diagram of the prior art shifter in the prior art execution unit;

FIGS. 5A, 5B, and 5C are address maps for the extended architecture's user mode, supervisor mode, and kernel mode virtual address spaces;

BRIEF DESCRIPTION OF THE TABLES

Figure 2A:
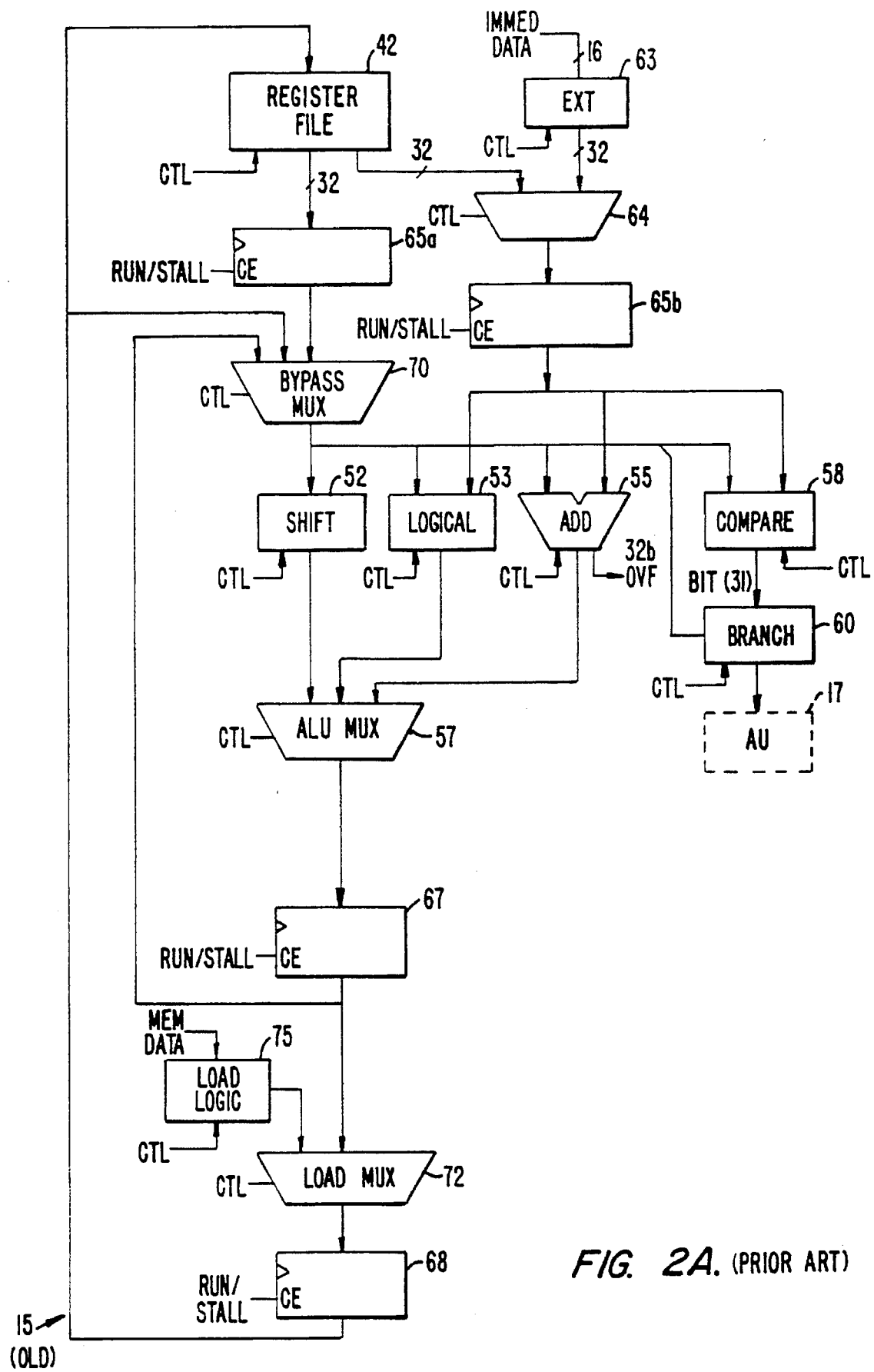
FIG. 2A is a block diagram of the prior art execution unit.

Table 1 is a list of abbreviations;

Table 2 shows the instruction formats;

Tables 3A–3D show the immediate instructions;

Tables 4A–4C show the register instructions;

Tables 5A and 5B show the jump instructions;

Tables 6A and 6B show the exception instructions; and

Table 7 shows the TLB format.

DESCRIPTION OF SPECIFIC EMBODIMENTS

Introduction and Definitions

The present invention provides a technique for extending a pre-existing architecture to a new architecture characterized by either or both of a larger data word size and a larger virtual address space.

The specific prior art 32-bit architecture described below is a RISC (reduced instruction set computer) architecture, which was implemented on RISC processors known as the R2000, R3000, and R6000, manufactured by MIPS Computer Systems, Inc., Sunnyvale, Calif. A comprehensive description of this architecture is provided in the 1988 Prentice Hall book "MIPS RISC Architecture" by Gerry Kane (Library of Congress No. 88-060290), the disclosure of which is incorporated by reference. The 64-bit extension provides a number of new 64-bit instructions, but includes substantially all the old 32-bit instructions.

As a matter of nomenclature, the terms "doubleword" and "halfword" will normally refer to 64-bit and 16-bit entities. The term "word" is sometimes used generically, and sometimes to refer to a 32-bit entity. Bits are normally numbered with bit(O) being the least significant (rightmost) bit. Bytes within a word or halfword may be ordered in a big-endian (byte(O) leftmost) or a little-endian (byte(O) rightmost) system.

The term "sign-extension" refers to an operation that is performed when a data entity is smaller than the size of the container in which it is stored. In such a case, the most significant bit (the sign bit) is replicated in the vacant bits positions to the left. For example, sign-extension of a 32-bit entity to be stored in a 64-bit container entails storing the 32-bit entity at bit positions (31..0) of the 64-bit container, and storing the value of bit(31) of the 32-bit entity in all of bit positions (63..32) of the container.

The term "zero-extension" refers to the operation wherein zeros are used to fill the bit positions to the left of a data entity that is smaller than the container.

The term "extension" is used generically, referring to either sign-extension or zero-extension, as the case may be (e.g., depending on the definition of the particular instruction).

The term "true 64-bit entity" will sometimes be used to refer to a 64-bit entity whose data content is more than 32 bits, i.e., not a 32- or fewer-bit entity that has been sign-extended to 64 bits.

The term "two's complement overflow" refers to a situation where the carryouts from the two most significant bits differ. This occurs when the addition of two positive numbers or two negative numbers produces a result outside the permissible range. For 64-bit numbers, the range is $-2^{63}$ to $(2^{63}-1)$. Overflow without carryout from bit(63) occurs, for example, in an attempt to add $(2^{63}-1)$ and 1. The correct result is $2^{63}$, but the computed result is $-2^{63}$. Carry out without overflow occurs, for example in adding −1 (which is 64 1's in two's complement binary form) and 1. The correct result is 0 while the computed result is 0 with a carryout from bit(63).

The term "32-bit overflow" or "32-bit two's complement overflow" refers to a situation where the carryouts from bit(31) and bit(30) differ. This comes up in two contexts. In the context of adding 32-bit entities, it has the same meaning and effect as defined above. In the context of adding two 32-bit entities, each sign-extended to 64 bits, the result of such an overflow is a 64-bit entity having bit(32) different from bit(31), i.e., a 64-bit entity that is no longer in sign-extended form.

This relationship between overflow and sign-extension will be described in the simpler context of sign-extending 8-bit entities to 16 bits. Consider first a case where the result of adding sign-extended entities is sign-extended, for example the sum of the hexadecimal numbers 7F and 80. As 8-bit entities the sum is FF. The sum of the sign-extended versions of these, namely the sum of 007F and FF80, is FFFF, which is the sign-extended version of the sum FF. Consider next a case where the result of adding sign-extended entities is not sign-extended, for example the sum of 7F and 01. As 8-bit entities, the sum is 80 (which represents a two's complement overflow). The sum of the sign-extended versions of these, namely the sum of 007F and 0001, is 0080. However, the result is not a sign-extended entity, since the proper sign-extended entity would be FF80.

System Overview

FIG. 1 is block diagram of a single-chip processor 10. With a few exceptions, indicated below, the system overview description applies to prior art processors and to a processor under development incorporating the extended architecture of the present invention. The main difference at this high level is that the prior art processor was characterized by a 32-bit word size and virtual address while the extended architecture is characterized by a 64-bit word size and a virtual address of up to 64 bits.

The functional organization and pipeline discussed below corresponds to the R2000 processor.

Processor 10 comprises six synchronized functional units: a master pipeline control unit (MPC) 12, an execution unit (EU) 15, an address unit (AU) 17, a translation lookaside buffer (TLB) 20, a system coprocessor 22, and an external interface controller (EIC) 25. These functional units communicate with each other over a number of internal buses including a data/instruction bus 30, a virtual address bus 32, and a physical address bus 33. Communication off-chip is over data, address, and tag buses 35.

Instructions are issued at a peak rate of one instruction per cycle, with a five-stage pipeline. MPC 12 includes instruction decode circuitry 37 for decoding instruction fields latched off data/instruction bus 30. Upon decoding instructions, the MPC provides appropriate control signals to the other functional units. It also includes fault processing logic 38 for controlling the pipeline if any abnormal conditions arise. For example, when a cache miss occurs, the MPC stalls the pipeline. If another operation, such as an address translation, cannot be completed without intervention, the MPC shuts down the pipeline and transfers control to the operating system. The MPC also serializes simultaneous exceptions and ensures that execution can resume precisely after exception service.

EU 15 will be described in greater detail below. For this initial discussion, it suffices to note that the EU includes a register file 42 containing a number of general purpose registers, an ALU 45 for performing logical, shift, and addition operations, and a multiply/divide unit 47. Register file 42 contains 32 registers, with Register(0) being hard-wired to a value 0. There are also special registers HI and LO used for multiply and divide instructions. In the prior art architecture and hardware implementation, the registers, ALU, and data paths within the execution unit are 32 bits wide; in the extended architecture, they are 64 bits wide.

The EU fetches two source operands from the registers every cycle. The operands are passed on to the ALU, or are sent to AU 17 or EIC 25. Simultaneously, the EU writes one result from the ALU, AU, or memory back into the registers. Bypassing allows an ALU or memory reference to take its source operands from a preceding operation, even if that result has not been written into the register file. Multiply/divide section 47 operates autonomously from the rest of the processor, so it can run in parallel with other ALU operations.

AU 17 will be described in greater detail below. For this initial discussion it suffices to note that the AU includes a program counter (PC) 50 and shares register file 42 with EU 15. In the prior art architecture and hardware implementation, the PC and data paths in the AU are 32 bits wide; in the extended architecture and hardware implementation, they are 64 bits wide. In the extended architecture and hardware implementation, the PC and data paths are 64 bits wide. The AU produces an instruction or data virtual address on each of the two clock phases per cycle. It generates the instruction address from the current PC, from a branch offset from the PC, or from a jump address coming directly from the EU. On subroutine calls, the AU also passes the PC back to the EU as a return link. The AU generates the data address from the base register and instruction offset provided by the EU.

TLB 20 is fully associative, and receives instruction and data virtual addresses on alternate clock phases, for mapping to physical addresses. Each translation combines the virtual address with the current process identifier. Thus, the TLB need not be cleared on context switches between processors.

System coprocessor 22 translates virtual addresses to physical addresses, and manages exceptions and transitions between kernel and user states. It also controls the cache subsystem and provides diagnostic control and error recovery facilities. One of the system coprocessors, referred to as coprocessor (0), and TLB 20 together may be referred to as the memory management unit. The system coprocessor includes a number of special registers, including a status register 51, which contains the kernel/user mode, interrupt enable, the diagnostic state of the processor, and in the extended architecture bits supporting a 32-bit mode and a supervisor mode.

EIC 25 manages the processor interface with the separate instruction and data caches, main memory, and external coprocessors. It generates and tests data and address-tag parity on all cache operations to aid system reliability. The EIC also watches external interrupt and internal software interrupt.

Prior Art Architecture—Instruction Set Overview

All processor instructions consist of one 32-bit word. Table 1 sets forth the instruction formats for the three processor instruction types (Immediate, Jump, and Register), and for the coprocessor instructions. The immediate-type instructions include load, store, ALU immediate, and branch instructions. The Jump-type instructions include direct jump instructions. The Register-type instructions include ALU 3-operand (add, subtract, set, and logical), shift, multiply/divide, indirect jump, and exception instructions.

An immediate instruction specifies two registers and a 16-bit immediate field. In the case of load and store instructions, the registers are a base register and source/destination register, and the immediate field contains an address displacement (offset) that is sign-extended and added to the content of the base register. The resulting virtual address is then translated, and the data transferred between the addressed memory location and the source/destination register. In the case of computational (ALU immediate) instructions, the immediate field is extended, combined with the content of the source register, and the result stored in the destination register. In the case of branch instructions the immediate field is sign-extended and added to the PC to form a target address.

A register instruction specifies up to three registers and one numerical field. In the case of add, subtract, AND, OR, XOR, and NOR instructions, two source registers are combined and the result stored in the destination register. In the case of set-on-less-than instructions, two source registers are compared, and depending on the relative values, the destination register is set to a value of 1 or 0. In the case of shift instructions, the contents of one source register are shifted by a specified number or by a number defined by the low order bits of the content of a source register, sign-extended or zero-extended, and stored in the destination register. For multiply instructions, the contents of two source registers are multiplied and the double result stored in the LO and HI special registers. For divide instructions, the content of one source register is divided by the content of the other, and the quotient and remainder are stored in the LO and HI registers. The LO and HI registers can also be written and read by move instructions.

Many of the instructions (load, set-on-less-than, multiply, divide) have "unsigned" counterparts where operands are treated as unsigned integers rather than two's complement integers. The addition and subtraction instructions also have "unsigned" counterparts, but the term has a different connotation. The regular addition and subtraction instructions trap on an overflow (carryouts from bit(30) and bit(31) differ) while the unsigned versions do not trap on an overflow. The definition of separate instructions that trap and don't trap represents the chosen alternative to using a condition code specifying an overflow.

Prior Art Execution Unit

FIG. 2A is block diagram showing the organization and data paths within a prior art embodiment of EU 15 corresponding to the R2000 processor. FIG. 2 is a somewhat stylized representation showing only those portions that are relevant to an understanding of the present invention. For example, the figure is a register-based representation of what is actually a latch-based implementation using a two-phase clock. Additionally, while the hardware for the RF, ALU, MEM, and WB stages is shown, that for the IF stage is not. It should be understood that control signals resulting from the instruction decode by MPC 12 are communicated to the various elements in the figure. With a few exceptions, these control signals are shown generally as "CTL" with the understanding that CTL designates different signals in different places.

In this embodiment register file 42, ALU 45, and all the other registers and data paths are 32 bits wide. ALU 45 is shown as comprising a shift unit 52, a logic unit 53, an adder 55, and an ALU multiplexer 57. Associated with the ALU is conditional branch circuitry including a comparison circuit 58, which compares two data operands, and branch decision logic 60. The branch decision logic makes the branch decision based on the result of the comparison, or the sign bit (bit(31)) of one of the operands, or both, depending on the particular branch instruction, and sends a control signal to AU 17. Zero determinations are made by comparing to Register(O).

Multiplexer 57 provides an ALU output selected from the outputs of the shift unit, the logic unit, and the adder. Shift unit 52 receives a single operand, while logic unit 53 and adder 55 each receives two operands. The second operand may be register data or may be immediate data extended by extension circuitry 63, as selected by an operand multiplexer 64.

Adder 55 performs the addition, subtraction, and set-on-less-than instructions (the latter involve a subtraction). The adder includes circuitry for monitoring 32-bit overflow, which manifests itself as different carryouts from bit(30) and bit(31). As mentioned above, some of the addition and subtraction instructions trap on such an overflow.

Interposed at various points along the data path are pipeline registers 65a–b, 67, and 68. These registers are clocked every cycle unless MPC 12 specifies a stall condition, which is used to disable the registers' respective clock inputs. A bypass multiplexer 70 provides the ALU with an operand from any one of pipeline registers 65a, 67, and 68. This allows the ALU to have access to data that has been loaded or processed before that data is loaded into the register file. The ALU also receives an operand from pipeline register 65b.

All instructions follow the same sequence of five pipeline stages during execution. These stages are instruction fetch (IF), source operand fetch from register file (RF), ALU operation or data operand address generation (ALU), data memory reference (MEM), and write back into register file (WB). During the IF cycle, the processor translates the instruction virtual address to an instruction physical address and drives it out to the instruction cache. The processor chip receives the instruction and decodes it during the RF cycle. The source operands go to the appropriate arithmetic, logic, or address unit during the ALU cycle. If the instruction makes a memory reference, the data cache receives the translated data address during the MEM cycle and returns data for the register file write during the WB cycle. Writes for ALU operations occur in the same pipeline stage. Bypassing between instructions in the pipeline keeps the latency of branches and memory references to one cycle and allows ALU results to be used in succeeding instructions.

During the RF cycle, data is read from register file 42 and clocked into one or both of pipeline registers 65a–b. During the ALU cycle, data from the selected pipeline register is processed by the ALU and the result is clocked into pipeline register 67. (A number of conditional branch instructions depend on the sign of a data entity. To this end, bit(31) (the sign bit) of the bypass multiplexer output is communicated to sign bit test logic associated with the AU 17.) During the MEM cycle, the content of pipeline register 67 or the result of a fetch from memory is clocked into pipeline register 68. A load multiplexer 72 determines the source on the basis of signals from the instruction decoder. During the WB cycle, the content of pipeline register 68 is communicated to the register file and clocked into the appropriate register.

Data from memory (typically from the cache) is communicated to load logic 75, which receives signals from the instruction decoder. For load instructions that are loading less than a full 32-bit word from memory, the load logic performs sign-extension or zero-extension to 32 bits, depending on the particular instruction. The result of the sign-extension is that the leftmost bit of the byte or halfword from memory is replicated in the vacant bit positions to the left. The result of the zero-extension is that the bit positions that are not filled by the loaded data entity are written with zeros.

FIG. 2B is an expanded block diagram of 32-bit shifter 52. As can be seen, the shifter has the capability to shift in 0's for left shifts and is provided with a multiplexer 76 for shifting either 0's for logical right shifts or the sign bit (bit((31)) for arithmetic right shifts Prior Art Architecture—Addressing Overview In the prior art architecture, sometimes referred to as the 32-bit architecture, virtual addresses are 32-bit entities. The virtual memory system provides for the logical expansion of the physical memory space of the machine by translating addresses composed in the 32-bit virtual address space into the physical memory space of the machine. The number of bits in a physical address is designated PSIZE. For R2000 and R3000 processors, PSIZE=32 and virtual address mapping uses 4096-byte (4-KB) pages. Thus, mapping via the TLB effects only the most significant 20 bits of a 32-bit virtual address, namely the virtual page number (VPN), while the remaining 12 bits, referred to as the offset, are passed along unchanged. The number of bits in the offset is designated OSIZE. For R6000 processors, OSIZE=14, PSIZE=36, and pages are 16384 bytes (16 KB) with an 18-bit VPN. The virtual address is extended with an address space identifier (ASID). The ASID field is 6 bits for R2000 and R3000 processors, and 8 bits for R6000 processors.

In the discussions below a given bit(i) or given bits(j..k) of the virtual address will be referred to as VA(i) or VA(j..k). Similarly, bits in the physical address will be referred to as PA(i) or PA(j..k). Bits output from the TLB will be referred to as TLB(j..k) with the bit positions referring to corresponding bit positions in the physical address. Thus, since the offset bits are not translated, the TLB output bits are TLB((PSIZE-1)..OSIZE) or TLB(31..12) for R2000 and R3000 processors and TLB(35..14) for R6000 processors.

The prior art processors (R2000, R3000, and R6000) that support the 32-bit architecture can operate in a user mode or a kernel mode as determined by one or more bits in the machine's status register.

Figure 3C:
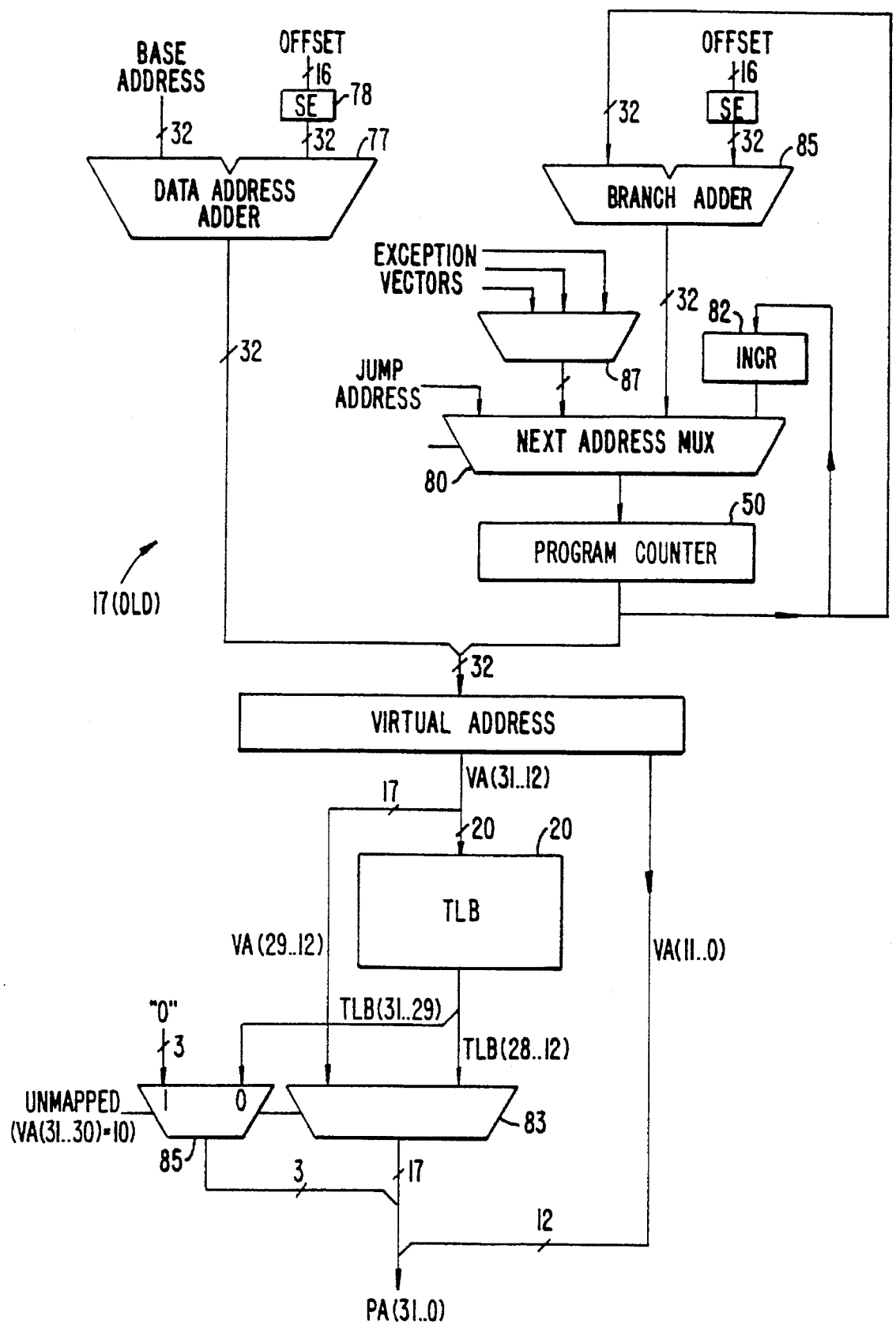
FIG. 3C is a block diagram of the prior art address unit and address translation circuitry.
Figure 3A:
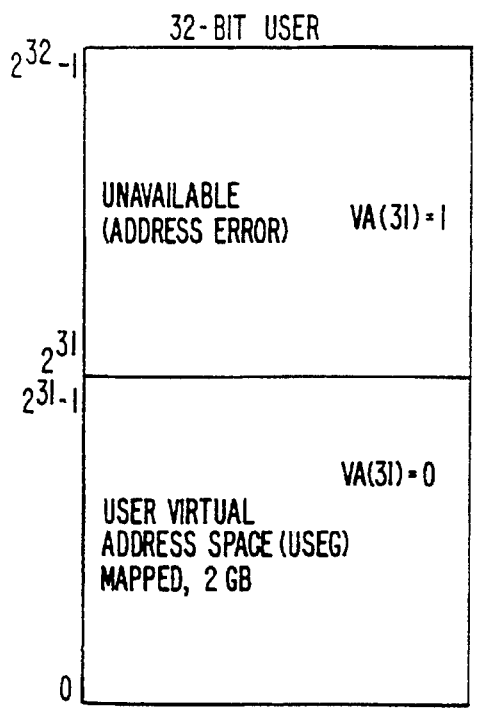
FIGS. 3A and 3B are address maps for the prior art user mode and kernel mode virtual address spaced.

FIG. 3A is an address map for the user mode virtual address space. A processor operating in user mode provides a single, uniform, mapped virtual address space of $2^{31}$ bytes (2 GB). In this context, the term "mapped" means that the virtual address is translated by TLB 20, while "unmapped" means the address is not translated by TLB 20 and the physical address bits are taken directly from the virtual address. All valid user-mode virtual addresses have bit(31)=0 and any attempt to translate an address with bit(31)=1 or fetch from such an address causes an address error exception.

The computation of a data address entails adding an immediate offset to the content of a base register. It is possible to start with a base register content having bit(31)=1, which would not be a valid user mode address, and by adding a negative offset, to provide a data address having bit(31)=0 and two's complement overflow. It is also possible to start with a base register content having bit(31)=0, and by adding an offset, to provide a data address having bit(31)=1, with two's complement overflow. The 32-bit architecture ignores the overflow in either case, but for the case that results in bit(31)=1, an address error exception will occur.

The computation of an instruction address may entail adding an immediate offset (or 1) to the content of the PC. In this case, the PC cannot contain an address with bit(31)=1, so it is impossible to create a valid user address with two's complement overflow.

Figure 3B:
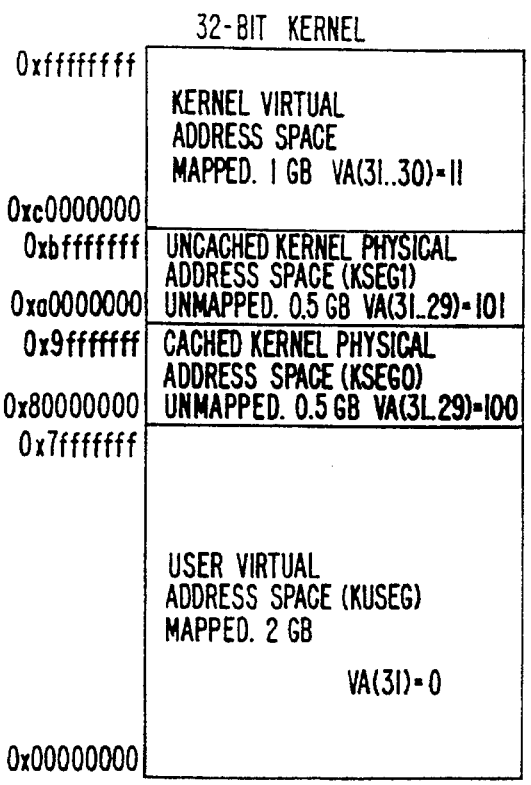

FIG. 3B is an address map for the kernel mode virtual address space. For operation in kernel mode, four distinct virtual address spaces are simultaneously available, differentiated by the high-order bits of the virtual address. When VA(31)=0, the virtual address space selected covers the full 2-GB current user address space. When VA(31..29)=100, the virtual address space selected is a $2^{29}$-byte (0.5-GB) cached, unmapped kernel physical address space. When VA(31..29)=101, the virtual address space selected is a 0.5-GB uncached, unmapped, kernel physical address space. When VA(31..30)=11, the virtual address space selected is a $2^{30}$-byte (1-GB) mapped, kernel virtual space. While the virtual addresses for the unmapped kernel spaces (addresses with VA(31..30)=10) do not pass through the TLB, they are mapped (in a limited sense) as a block to physical addresses in the range 0-($2^{29}$-1). That is, they have physical addresses with PA(31..29)=000. The kernel addressing is constrained so that the base address register must point to the same space as the result.

Prior Art Address Generation and Translation

FIG. 3C is a block diagram showing the organization and address paths within a prior art embodiment of AU 17 and associated address translation circuitry corresponding to the R2000 processor. In this embodiment, PC 50 and all the other registers and data paths are 32 bits wide.

Virtual data addresses for load and store instructions are computed by a data address adder 77. Adder 77 combines a base address from one of the registers with an offset derived from the 16-bit immediate field in the instruction. A sign-extension circuit 78 sign-extends the 16-bit offset to 32 bits before the offset is combined at the adder. Depending on whether the instruction is a load or a store, the data entity is read from the addressed memory location and loaded into the destination register, or the data entity in the source register is written into the addressed memory location.

The instruction address portion of the AU includes PC 50 and a next address multiplexer 80 which loads the PC with a selected one of four inputs. The first input, selected for normal sequential operation, is the next sequential address. This is provided by an incrementer 82, which receives the content of the PC and increments it. The second input, selected in the case of a jump instruction, is a jump address. This may be provided from the instruction or from the register file. The third input, selected in the case of a branch instruction with the branch taken, is a branch target address provided by a branch adder 85. The branch adder combines the content of the PC and an offset derived from the 16-bit immediate field in the branch instruction. The fourth input, selected in the case of an exception, is an exception vector. This is provided by an exception multiplexer, which receives at its inputs fixed exception vectors.

The virtual addresses from data address adder 77 and PC 50 are communicated to the address translation circuitry which generates physical addresses. The 12-bit offset (VA(11..0)) bypasses TLB 20 for all addresses and defines PA(11..0). VA(31..12) are communicated to the TLB and VA(29..12) bypass the TLB. A set of multiplexers 83 and 85 is controlled to select TLB(31..12) for the mapped spaces, or three leading zeros and VA(28..12) for the unmapped kernel spaces. As noted above the unmapped kernel spaces are those with VA(31..30)=10, and it is this condition that is used to control the multiplexers.

In the R2000 and R3000 processors, TLB 20 is a fully associative on-chip TLB containing 64 entries, all of which are simultaneously checked for a match with the extended virtual address. A TLB entry is defined as a 64-bit entity, but only 50 bits are stored, namely the 20-bit VPN, the 6-bit ASID, a 20-bit page frame number (PFN), and four bits specifying the cache algorithm for the page, whether the page is cached, whether the page is dirty, and whether the entry is valid. In the R6000 processor, the TLB is a two-set associative in-cache TLB.

Instruction Set for the Extended Architecture

The extended architecture assumes a hardware configuration where the registers, ALU, and other data paths within the EU are 64 bits wide. The instruction set includes all the prior art (32-bit) instructions, as well as a number of 64-bit instructions for manipulating doublewords. Thus, the extended architecture is a superset of the prior art architecture. However, it should be understood that the 32-bit instructions actually manipulate 64-bit entities, but that in some cases, the 64-bit entities are sign-extended or zero-extended versions of entities whose actual data content is 32 bits or fewer (words, halfwords, and bytes).

As will be seen below, many of the 32-bit instructions operate correctly on true 64-bit entities as well as on 32-bit entities sign-extended to 64 bits. The instruction decode circuitry in the MPC is able to provide enough information to the EU to specify whether the instruction is one of the 32-bit instructions or one of the doubleword instructions.

A key feature of the extended architecture is that a hardware implementation that supports the extended architecture can run programs containing only 32-bit instructions and manipulating 32-bit or smaller entities and produce exactly the same results as those produced by a prior art processor that supports the 32-bit architecture. This is accomplished by requiring that the 32-bit instructions operate on 64-bit sign-extended versions of 32-bit data entities and produce results that are 64-bit sign-extended versions of the correct 32-bit result. In the description that follows, it will be pointed out which of the 32-bit instructions will naturally operate on sign-extended entities to produce a sign-extended result, and which of them operate on sign-extended entities but require subsequent sign-extension. Where a 32-bit instruction operating on sign-extended entities does not naturally produce a sign-extended result, extra sign-extension circuitry is needed. That means that the instruction will in general not work on true 64-bit entities. In those cases, separate 64-bit (doubleword) instructions are added to the instruction set.

The instructions are listed in a series of tables specifying the instruction description and its opcode, an indication for 32-bit instructions of what type of extension, if any, is necessary in order that the result be a sign-extended or otherwise properly defined quantity, and for 64-bit instructions an indication that the instruction is unique to the extended architecture.

Tables 3A–3D set forth most of the immediate instructions. As noted above, immediate instructions specify an opcode, a pair of registers, and an immediate field which may be data or an offset for address calculation.

Table 3A sets forth the load instructions. The byte and halfword load instructions (LB, LBU, LH, LHU), when executed on a 32-bit machine, produce results that are sign-extended or zero-extended to 32 bits. It is noted that the unsigned load instructions (LBU, LHU) use zero-extension from 8 or 16 bits to 32 bits. Thus, the zero-extension to 64 bits is equivalent to sign-extension, and these instructions work on a 64-bit machine with sign-extension to 64 bits. Similarly, the word load instruction (LW) and the special unaligned word load instructions (LWL, LWR) are defined in the 64-bit architecture to sign-extend from bit(31) and thus require no new instructions. Operation on true 64-bit entities requires four new doubleword load instructions and an unsigned word load instruction (LWU) which operates analogously to the unsigned byte and halfword load instructions (LBU, LHU) in that it fills bits(63..32) to the left with 0's.

Table 3B sets forth the store instructions. For bytes, halfwords, and words stored as sign-extended 64-bit entities, the existing instructions work identically for 32-bit and 64-bit operation since the instructions ignore at least the upper 32 bits of the 64-bit register. New doubleword store instructions (SD, SDL, SDR, and SCD) are needed for the 64-bit architecture.

Table 3C sets forth the ALU immediate instructions. The bit-wise logical immediate instructions (ANDI, ORI, and XORI) produce sign-extended results when presented with sign-extended input operands. It is noted that the 16-bit immediate value is zero-extended to 32 bits in the 32-bit architecture and to 64 bits in the 64-bit architecture before being combined with the register value. Accordingly, these instructions work for both 32-bit and 64-bit operations.

The addition instructions (ADDI and ADDIU) present a need for additional 64-bit instructions, but for different reasons. ADDI is defined in the 32-bit architecture to trap on 32-bit two's complement overflow, and not write a result into the destination register. Thus if a result of adding two sign-extended entities is written, the result is in sign-extended form, so no sign-extension of the result is needed. However, a separate 64-bit instruction, (DADDI), which traps on 64-bit two's complement overflow, is needed for operation on true 64-bit entities since 32-bit overflow is simply not relevant.

ADDIU does not trap on 32-bit overflow, and thus can produce a result that is not sign-extended when operating on sign-extended inputs. Therefore, sign-extension of the result is required, and operations on true 64-bit entities require a new instruction (DADDIU) that does not sign-extend the result.

The immediate load (LUI) requires sign-extension as do the memory loads. The set-on-less-than instructions (SLTI and SLTIU) load a 1 or a 0, the 64-bit version of which is the sign-extended (and zero-extended) 32-bit version. No separate sign-extension circuitry, and therefore no new instructions are required.

Table 3D sets forth the branch-on-condition instructions. The branch instructions that test equality of two entities (BEQ, BNE, BEQL, and BNEL) do 64-bit bitwise comparison, and therefore operate on sign-extended input operands and true 64-bit operands the same way. Therefore, no new instructions are necessary. The remaining conditional branch instructions test the sign bit, namely bit(63), but with sign-extended input operands, this is the same as bit(31) for 32-bit operation. Accordingly, no new instructions are necessary.

Tables 4A–4C set forth most of the register instructions. As noted above, the register instructions specify up to three registers.

Table 4A sets forth the ALU 3-operand register instructions wherein the contents of two registers are processed, and a result or a value indicative of the result is stored in a third register. The addition and subtraction instructions (ADD, ADDU, SUB, and SUBU) require new 64-bit instructions for the same reasons as discussed above in connection with ADDI and ADDIU. ADD and SUB are defined to trap on 32-bit overflow and thus require DADD and DSUB instructions that trap on 64-bit overflow. ADDU and SUBU are not guaranteed to produce sign-extended results, and therefore require sign-extension of the result. Accordingly, new instructions (DADDU and DSUBU) are required for doubleword additions and subtractions without sign-extension.

The set-on-less-than instructions (SLT and SLTU) provide zero-extended values of 0 and 1 in the 32-bit context, and therefore provide sign-extended versions in the 64-bit context. Accordingly, no new instructions are required. The bitwise logical instructions (AND, OR, XOR, and NOR), given sign-extended input operands, naturally produce sign-extended results, and no new instructions are required.

Table 4B sets forth the shift instructions. Shifting a sign-extended entity does not normally produce a sign-extended result, and therefore sign-extension circuitry is required. Special logic is also required for the logical right shift operations (SRL and SRLV) in order to shift 0's into bit(31) prior to sign-extension (assuming that some shift occurs). Accordingly, additional doubleword shift instructions as well as instructions for shifts by more than 32 bits are provided.

It is noted that the shift right arithmetic instructions (SRA and SRAV) sign-extend from the left and therefore provide the correct result for sign-extended entities and true 64-bit entities. Nevertheless separate doubleword instructions (DSRA and DSRAV) are provided. This is necessary for the variable shifts since SRA uses bits(4..0) of the specified register to determine the shift amount while bits(5..0) are needed to specify the shift amount for true 64-bit entities. This is not an issue for SRA where the shift amount is a 5-bit field in the instruction. Nevertheless, it is convenient to define a new 64-bit instruction.

Table 4C sets forth the multiply and divide instructions. In the multiply instructions, the low-order word of the double result is loaded into the LO special register and the high-order word of the double result is loaded into the HI special register. Separate sign-extension is required to fill the 64-bit LO and HI registers with the 32-bit results. Similarly, on the divide instructions, the quotient and the remainder are loaded into the LO and HI special registers and separate sign-extension is also required here. Accordingly, separate double-word multiply and divide instructions are required. The instructions that transfer contents between the special registers and general registers work equally well for sign-extended and true 64-bit entities, and no additional instructions are required.

Tables 5A and 5B show the direct (immediate) and indirect jump (register) instructions. In the direct jump instructions in the 32-bit architecture, the 26-bit target address is shifted left two bits and combined with bits(31..28) of the PC, and the result jumped to. In the extended architecture, the combination is with bits(63..28) of the PC. If the addresses are sign-extended, correct operation results without any additional instructions. The indirect jumps, namely the jumps to the content of a register, naturally occur if 32-bit addresses are sign-extended to 64 bits.

Tables 6A and 6B set forth the exception instructions. No new instructions are required for the trap instructions for the same reasons as discussed above in connection with the conditional branch instructions.

Execution Unit for the Extended Architecture

FIG. 4 is a stylized block diagram showing the organization and data paths within an embodiment of execution unit that supports the extended architecture. The same reference numerals will be used for elements corresponding to those in FIG. 2, notwithstanding the fact that the elements in FIG. 4 are in general 64 bits wide and those in FIG. 2 are 32 bits wide. As with FIG. 2, only the relevant pipeline stages are shown.

It is important to make a distinction between the architecture as defined by the instruction set and the hardware implementation. For example, the hardware configuration described above in connection with the previous 32-bit architecture was in terms of the R2000 and R3000 processors, which internally use a 5-stage pipeline with each cycle divided into two phases. The prior art R6000 processor has a somewhat different 5-stage pipeline, while a processor currently under development for supporting the 64-bit architecture has an 8-stage pipeline.

The hardware that supports the extended instruction set architecture is represented as somewhat of an extension of the R2000/R3000 hardware implementation. This facilitates the description of the extended architecture and a hardware methodology for supporting it. It should be understood, however, that the hardware configuration for supporting the extended architecture need not be the same as that of the prior art processor.

In order to support the extended architecture defined above, extra extension circuitry is inserted in those data paths where the results of operating on sign-extended entities does not guarantee a sign-extended result.

To this end, extension circuitry 120 is inserted in the data path between shift unit 52 and ALU multiplexer 57. This extension circuitry is only activated for certain 32-bit shift instructions, which fact is denoted schematically by a control input with a set of signals designated 32S. The 32S signals specify, among other things, whether sign-extension or zero-extension is required.

Similarly, the load logic, designated 125, which provides data entities from the memory sub-system must now provide sign-extension or zero-extension to 64 bits for 32-bit words as well as halfwords and bytes. The load logic is shown as receiving generic control signals CTL and additional signals, designated 32L, specifying extension for 32-bit loads. The load logic can be viewed conceptually as sign-extending 32-bit entities to 64 bits, where the 32-bit entities themselves might be sign-extended or zero-extended versions of less-than- 32-bit entities.

Adder 55 contains circuitry for monitoring 64-bit two's complement overflow, which causes a trap for the DADD and DSUB instructions. For compatibility, the adder also monitors 32-bit overflow, which causes a trap for the ADD and SUB instructions. This is necessary also for the ADDU and SUBU instructions, which don't trap on 32-bit overflow but require sign-extension in the event of it.

Thus, it is at least sometimes necessary to sign-extend the result of combining two 32-bit signed integers, each sign-extended to 64 bits, in order for the result to be in sign-extended form. A straightforward extension to the hardware would be to provide sign-extension circuitry between adder 55 and ALU multiplexer 57 (just as is done with extension circuitry 120 for shift operations). However, addition is a more time-consuming operation than the shift and logical operations, and the addition of sign-extension circuitry following the adder would result in an overall performance penalty. Since the time to perform an addition operation tends to set a lower limit on the cycle time, the straightforward solution would either require two cycles for every addition or a longer cycle for all operations.

Figure 4A:
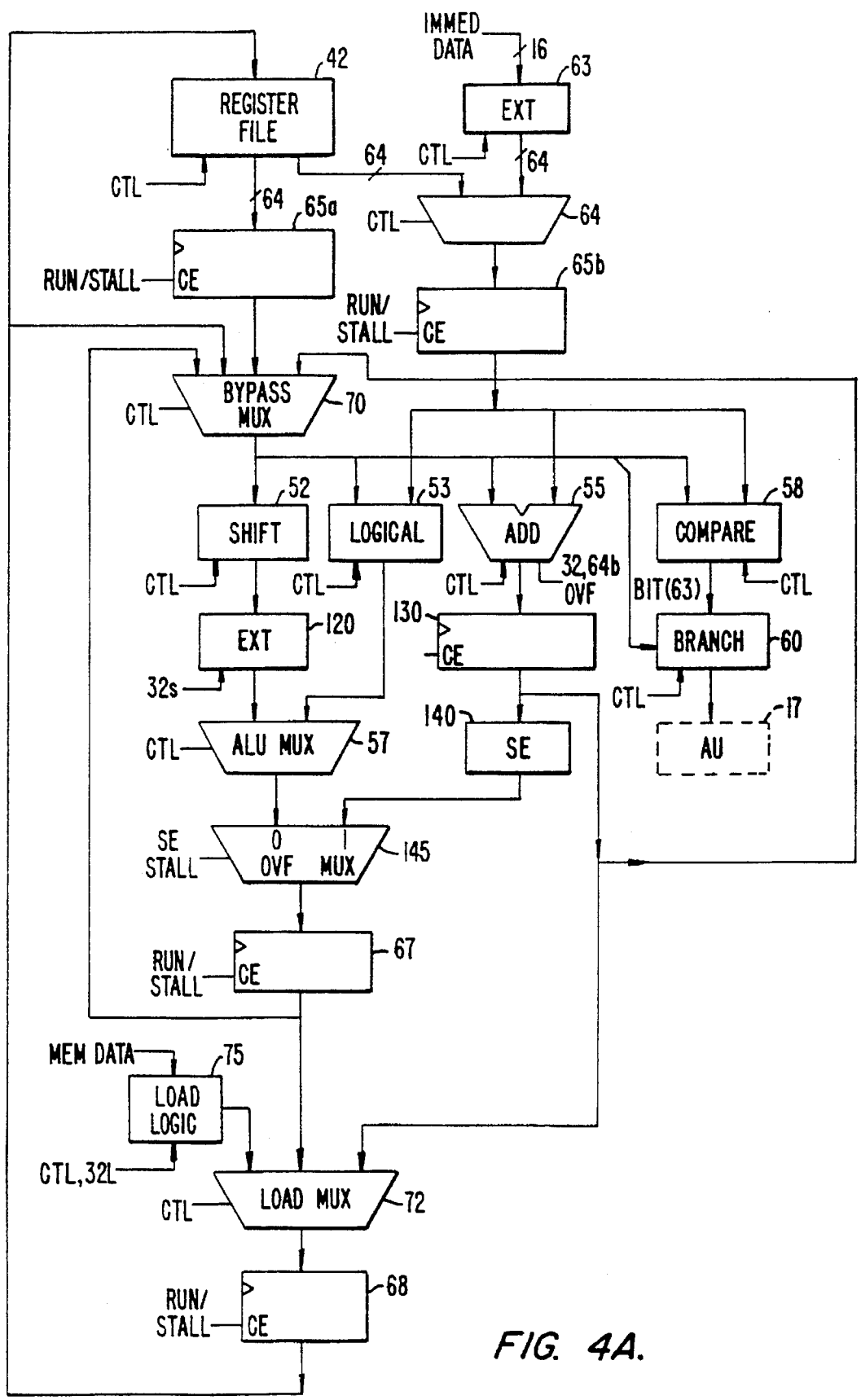
FIG. 4A is a block diagram of the execution unit for the extended architecture.
Figure 4B:
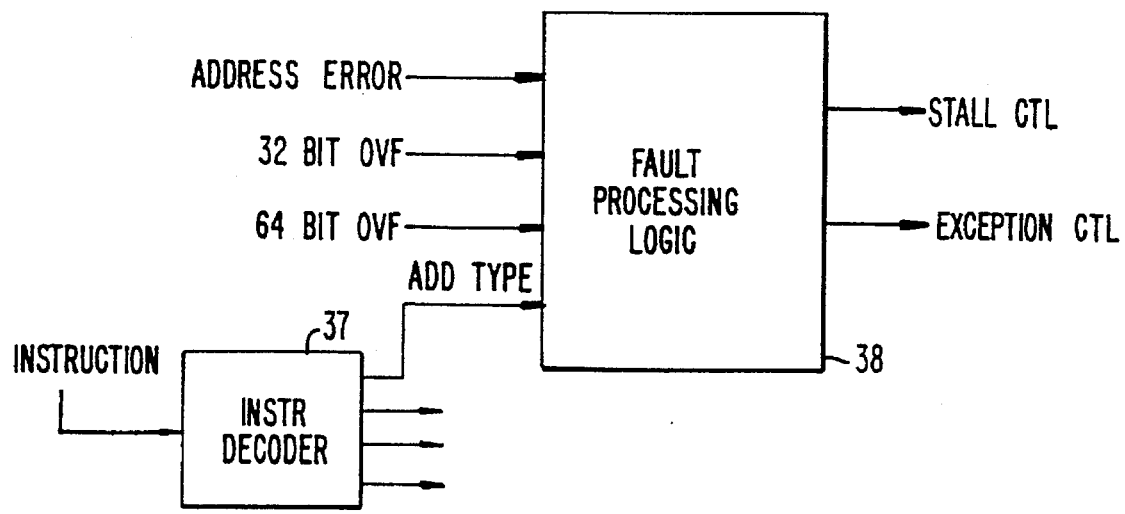
FIG. 4B is a block diagram showing certain portions of the master pipeline control unit.

Since 32-bit two's complement overflow occurs relatively infrequently, a hardware implementation as shown in FIG. 4A may be used. In this implementation, the output from adder 55 does not go through ALU multiplexer 57 and pipeline register 67, but rather goes through a separate pipeline register 130 and is directed to load multiplexer 72. The output of pipeline register 130 is also communicated to the input of bypass multiplexer 70 (as is the output of pipeline register 67). Thus, pipeline register 130 can be viewed as a parallel extension of pipeline register 67, with most addition results being introduced directly into the load multiplexer rather than via the ALU multiplexer.

However, an additional data path must be provided to accommodate the case where 32-bit two's complement overflow occurs in the addition of sign-extended operands. This is accomplished by a sign-extension circuit 140, coupled to the output of pipeline register 130, but outside the data paths from pipeline register 130 to load multiplexer 72 and bypass multiplexer 70. An extra multiplexer, referred to as overflow multiplexer 145, is interposed in the path between ALU multiplexer 57 and pipeline register 67, and is capable of selecting the output from sign-extension circuit 140.

When 32-bit overflow occurs with an ADDU or SUBU instruction, MPC 12 stalls the pipeline and controls overflow multiplexer 145 with a signal SE STALL to select the output from sign-extension circuit 140. This is shown schematically in FIG. 4B. This sign-extended output represents the correct result of the addition. Therefore, load multiplexer 72 and bypass multiplexer 70 can be provided with the correct result, which is inserted into the pipeline during the pipeline restart sequence. Thus, sign-extension circuit 140 is in the critical data path only in the event of overflow when it is needed; it is out of the critical path for addition of 64-bit operands or 32-bit sign-extended operands where overflow does not occur.

Figure 4C:
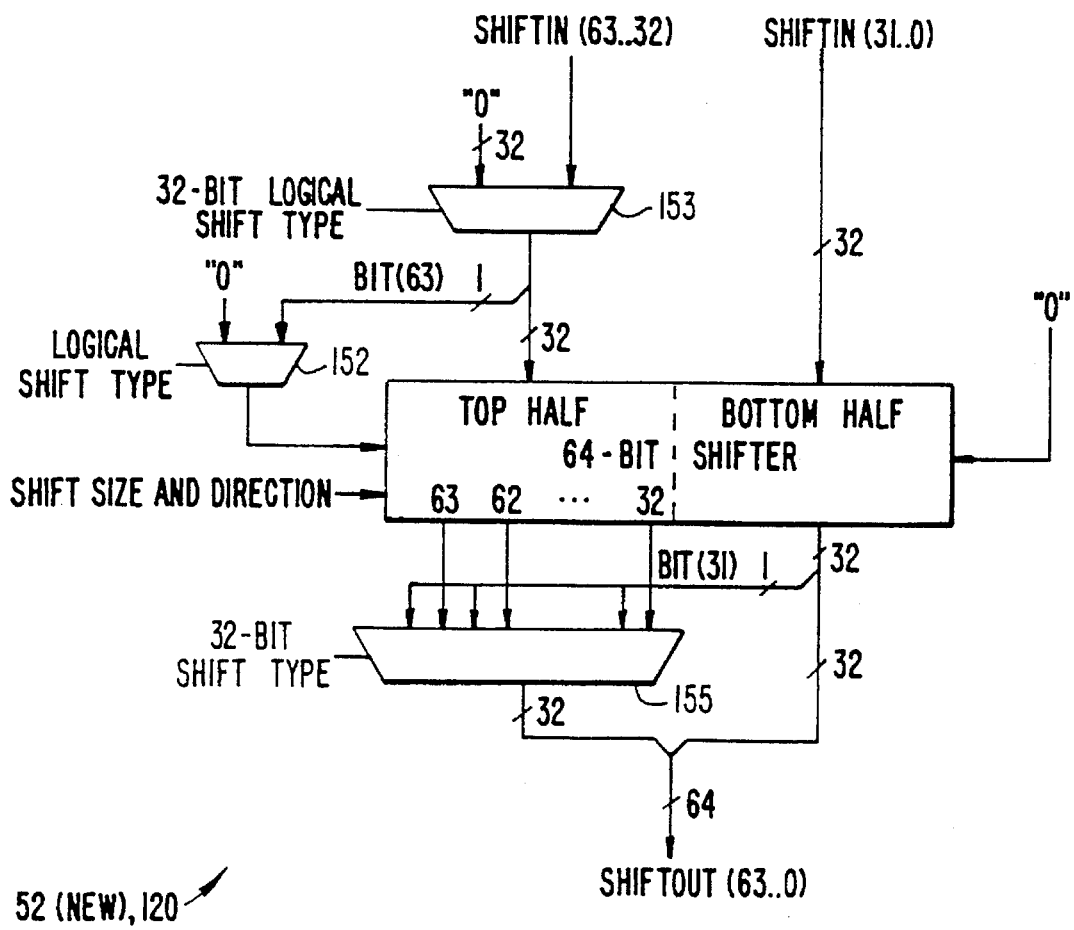
FIG. 4C is an expanded block diagram of the shifter in the execution unit for the extended architecture.

FIG. 4C is an expanded block diagram of 64-bit shifter 52 and associated extension circuitry 120. The shifter comprises top and bottom 32-bit sections. The shifter has the capability to shift in 0's for all left shifts and is provided a multiplexer 152 for shifting either 0's for logical right shifts or the sign bit (bit(63)) for arithmetic right shifts. Compatibility for 32-bit shifts is provided by multiplexers 153 and 155. For 32-bit logical right shifts, multiplexer 153 loads 0's into the top section of the shifter so that 0's are shifted into the vacated positions starting at bit(31). Multiplexer 155 selects the top section of the shifter or 32 copies of bit(31) of the bottom section for bits(63..32) of the result. This is necessary to provide sign-extension for the 32-bit left shifts. It is not strictly necessary for the 32-bit right shifts since multiplexers 152 and 153 can ensure a sign-extended result when the input is sign extended.

Addressing for the Extended Architecture

In the extended architecture, virtual addresses are 64-bit entities. A major objective of the extended architecture's addressing is to provide extended flat (non-segmented) subspaces while maintaining the prior architecture's addressing as a subset. To this end, the prior architecture's address space is carried forward in sign-extended form. Thus the 32-bit addresses of the prior architecture are stored and manipulated in sign-extended form.

A processor for the extended architecture may operate in user mode, supervisor mode, or kernel mode, as determined by bits in the machine's status register. The status register also contains bits that specify whether the machine is in the 32-bit mode or the 64-bit mode. In 32-bit mode, addresses are still stored and manipulated as 64-bit sign-extended entities.

As noted above, the physical address size PSIZE depends on the processor. A processor currently under development, referred to as the R4000, for supporting the 64-bit architecture has PSIZE=36. The extended architecture is not characterized by a fixed virtual address, but rather contemplates a processor-dependent virtual address size VSIZE in the range of 36–62 bits inclusive. As will be discussed below, this provides a number of $2^{VSIZE}$-byte virtual spaces. The practical significance of the use of VSIZE is that the TLB does not have to translate VA(61..VSIZE). Thus, assuming that VSIZE has been chosen to reflect reasonably foreseeable needs, the TLB does not have to be any larger than necessary. VSIZE can be increased in later processor implementations as the need for larger virtual address spaces truly arises, and it is only at this time that the burden of a larger TLB will have to be borne.

The R4000 processor has VSIZE=40. This means that it will provide virtual address spaces of 1024 GB, which should be adequate for the time being.

The primary emphasis from a compatibility point of view is to maintain compatibility of user programs. Thus the extended architecture of the present invention provides compatibility for user programs by maintaining addressing compatibility in 32-bit user mode. However, kernel programs tend not to be compatible from processor to processor, even within the same architecture. Therefore, the extended architecture does not guarantee compatibility in 32-bit kernel mode.

To maintain compatibility in 32-bit user mode, an address computation with a result having bit(31)=0 must be considered a valid user address, even if 32-bit two's complement overflow occurs. This requires that the result be sign-extended, or what is equivalent in this case, that bits(63..32) be forced to zero. Thus, in 32-bit user mode, bits(63..31) are all 0's, and the address references a 2-GB user address space, which appears as a subset of the extended user address space. Otherwise, an address exception occurs. It is the fact that two's complement overflow is allowed in the prior architecture that necessitates the 32-bit mode bit in the status register. However, the 32-bit mode is useful in its own right in that it can be used to select the TLB refill vector in case of a TLB miss.

In 32-bit kernel mode, the virtual address space is 4 GB, divided into five regions, differentiated by the high-order bits of the 32-bit portion of the virtual address. It is assumed that in 32-bit mode, any address presented to the address translation mechanism is in sign-extended form. When VA(31)=0, VA(63..32) are all 0's, and the virtual address space selected covers the full 2-GB current user address space. Kernel and supervisor addresses have VA(31)=1, and therefore VA(63..32) are all 1's. Thus, the four 0.5-GB spaces are at the extreme upper end of the $2^{64}$-byte space, i.e., with addresses between $(2^{64}-232+8000000H)$ and $(2^{64}-1)$. When VA(31..29)=100, the virtual address space selected is a 0.5-GB cached, unmapped kernel physical address space. When VA(31..29)=101, the virtual address space selected is a 0.5-GB uncached, unmapped kernel physical address space. When VA(31..29)=110, the virtual address space selected is a 0.5-GB mapped supervisor virtual address space. When VA(31..29)=111, the virtual address space selected is a 0.5-GB mapped kernel virtual address space. The first two of these 0.5-GB spaces correspond to 0.5-GB spaces in the 32-bit architecture on a 32-bit processor. The provision of the supervisor virtual address space represents a further differentiation of the 1-GB mapped, kernel virtual space of the 32-bit architecture.

Figure 5A:
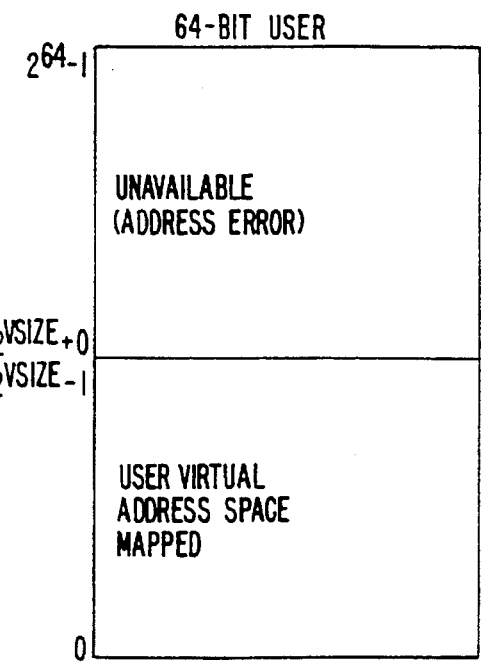

FIG. 5A is an address map for the 64-bit user mode virtual address space. In 64-bit user mode, the processor provides a single, uniform virtual address space of $2^{VSIZE}$ bytes where $62 \geq VSIZE \geq 36$. Different processor implementations may implement different virtual address space sizes, so long as they trap on addresses larger than implemented. When VSIZE bits are implemented, all valid user-mode virtual addresses have VA(63..VSIZE) all 0's and any attempt to reference an address with those bits other than all 0's causes an address error exception. Making these bits illegal for other uses guarantees that user programs will run on later processor implementations that are characterized by a larger value for VSIZE.

The virtual address calculation, which entails the addition of a 64-bit base register and a 16-bit offset, sign-extended to 64 bits, must not overflow from bits(61..0) into bits(63..62). The virtual address is extended with the contents of the address space identifier field to form unique virtual addresses. The mapping of these extended virtual addresses the physical addresses need not be one-to-one; but rather two virtual addresses are permitted to map to the same physical address.

Figure 5B:
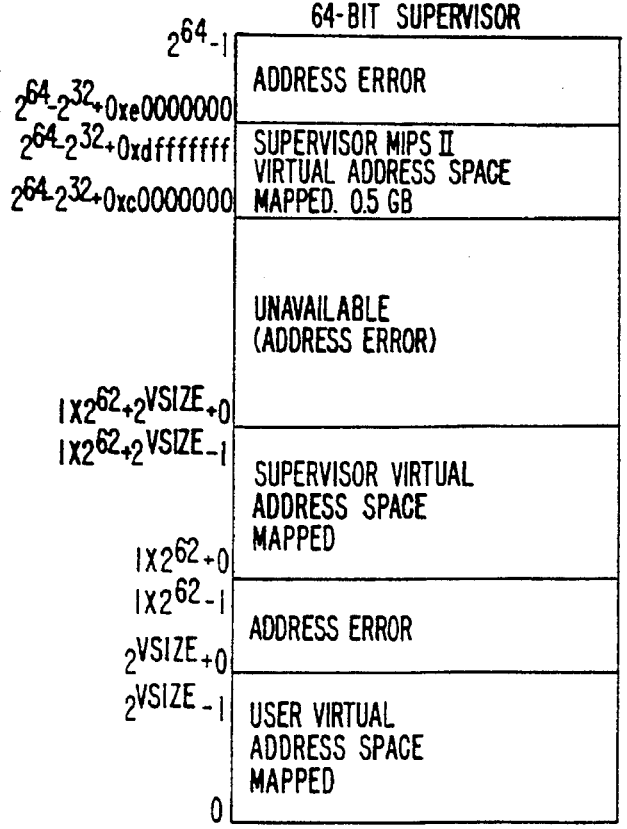

FIG. 5B is an address map for the 64-bit supervisor mode virtual address space. In 64-bit supervisor mode, there are two virtual address spaces of $2^{VSIZE}$ bytes as well as a $2^{29}$-byte (0.5-GB) space. When VA(63..62)=00, the virtual address space selected is the $2^{VSIZE}$ bytes of the current user address space. When VA(63..62)=01, the virtual address space selected is the $2^{VSIZE}$ bytes of the current supervisor address space starting at address $2^{62}$. When VA(63..62)=11, and VA(31..29)=110, the address references the 0.5-GB supervisor address space with a starting address of $(2^{64}-2^{32}+C0000000H)$.

FIG. 5C is an address map for the 64-bit kernel mode virtual address space. In 64-bit kernel mode, four distinct virtual address space regions are simultaneously available, differentiated by the high order bits of the virtual address, namely VA(63..62). When VA(63..62)=00, the virtual address space selected is the $2^{VSIZE}$ bytes of the current user address space. When VA(63..62)=01, the virtual address selected is the $2^{VSIZE}$ bytes of the current supervisor address space. When VA(63..62)=10, the virtual address space selected is one of eight $2^{PSIZE}$-byte unmapped kernel physical spaces located in the address range $2 \times 2^{62}$ to $(3 \times 2^{62}-1)$. The particular unmapped space depends on the values of VA(61..59), and the spaces start at addresses $2^{59}$ bytes apart. Addresses in the $(2^{59}-2^{PSIZE})$-byte gaps (addresses with VA(58..VSIZE) not all 0's) cause an address error. When VA(63..62)=11, the virtual address space selected is either a $(2^{VSIZE}-2^{31})$-byte kernel virtual address space starting at address $3 \times 2^{62}$ if VA(61..VSIZE) are all 0's, or a 2-GB region compatible with the 32-bit kernel mode space if VA(61..31) are all 1's.

Thus, it can be seen that the 32-bit addressing regime is a subset of the extended addressing. 32-bit addresses, sign-extended to 64 bits, map to the top and bottom 2-GB portions of the $2^{64}$-byte virtual address space. The 32-bit architecture's virtual addressing and the 32-bit mode of the 64-bit addressing can be brought into a closer correspondence by viewing the addresses as two's complement signed addresses. Viewed this way, the 32-bit space extends from $-2^{31}$ to $(2^{31}-1)$ with kernel addresses between $-2^{31}$ and $-1$, and user addresses between 0 and $(2^{31}-1)$. Similarly, the 64-bit space extends from $-2^{63}$ to $(2^{63}-1)$ with user and supervisor addresses between 0 and $(2^{63}-1)$ and kernel addresses between $-2^{63}$ and $-1$. The 32-bit address space then can be viewed as the center subset of the 64-bit address space, with 32-bit mode kernel and supervisor addresses between $-2^{31}$ and $-1$ and 32-bit mode user addresses between 0 and $(2^{31}-1)$.

Address Generation and Translation for the Extended Architecture

Figure 5D:
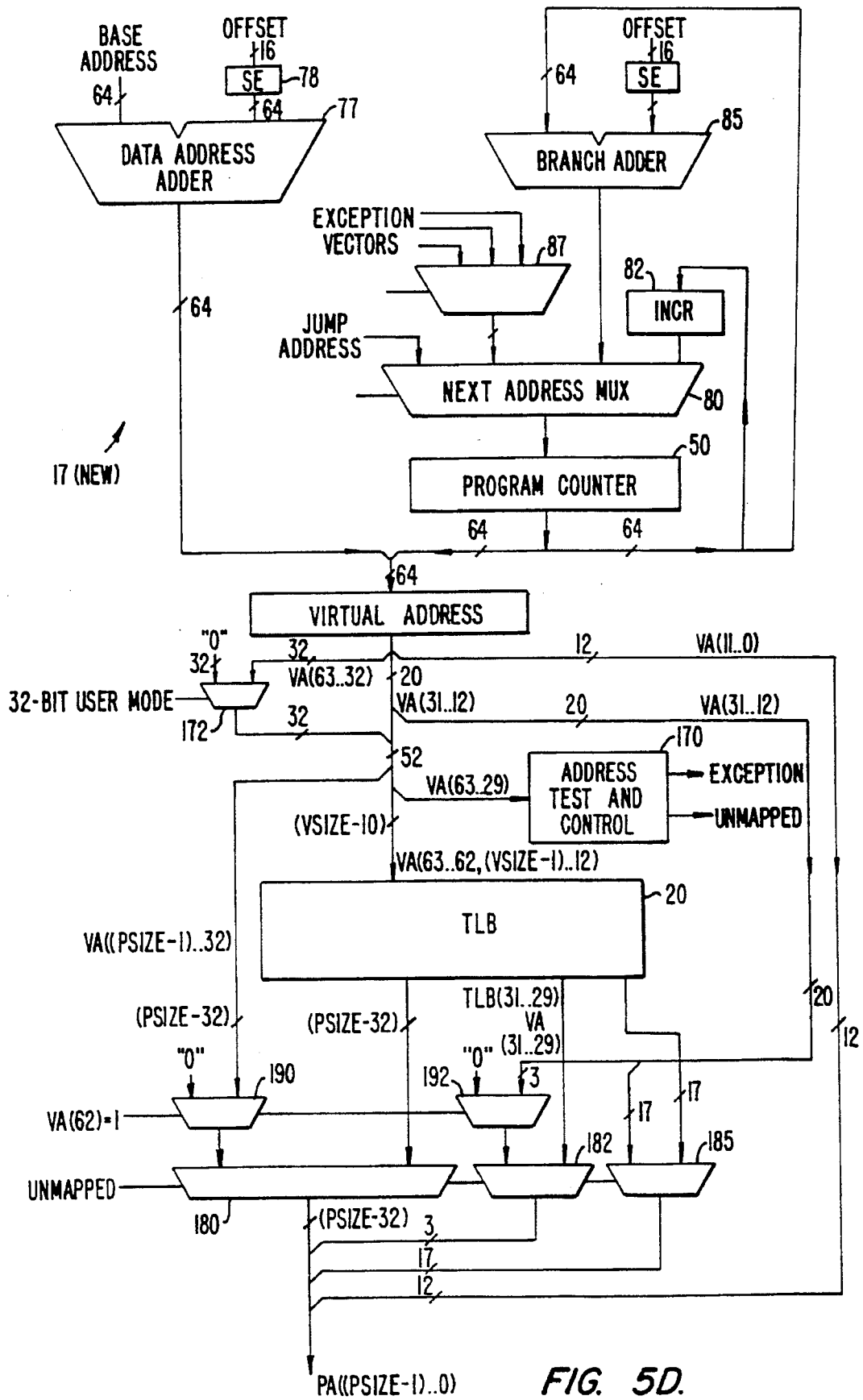
FIG. 5D is a block diagram of the address unit and address translation circuitry for the extended architecture.

FIG. 5D is a block diagram showing the organization and address paths within an embodiment of AU 17 and associated address translation circuitry that supports the extended addressing of the 64-bit architecture. The data address generation circuitry and the instruction address generation circuitry differ from the prior art in that the various elements are 64 bits wide. For example, sign-extension circuit 78 sign extends the 16-bit offset to 64 bits and the exception vectors are stored in sign-extended form.

The address translation circuitry differs from the prior architecture in that it accommodates a 64-bit address that includes portions that provide a flat (non-segmented) extended virtual address space while maintaining the 32-bit addressing as a subset. As in the case of the prior architecture, a 12-bit offset VA(11..0) bypasses TLB 20 and defines PA(11..0).

VA(63..62) and VA((VSIZE–1)..12) are communicated to TLB 20, and VA(63..29) are communicated to address test and control logic 170. A multiplexer 172 is interposed in the path and substitutes 0's for VA(63..32) in 32-bit user mode. The zeroing of the high order bits insures that a valid user address (VA(31)=0) that resulted in two's complement overflow is in sign-extended form.

A set of multiplexers 180, 182, and 185 provides PA((P-SIZE–1)..12) by selecting either TLB bits for the mapped spaces or virtual address bits for the unmapped kernel spaces. For the mapped spaces, the multiplexers select TLB((PSIZE–1)..12), which are combined with VA(11..0) to provide the physical address.

As noted above the unmapped spaces include a $2^{PSIZE}$-byte space having VA(63..62)=10 and the two $2^{29}$-byte spaces having VA(63..31) all 1's and VA(30)=0. The logical OR of these conditions is used to control multiplexers 180, 182, and 185 so that they select VA bits rather than TLB bits for the physical address. Specifically, when VA(62)=1, the compatibility unmapped spaces are indicated and 0's are substituted for VA((PSIZE−1)..29) by a set of multiplexers 190 and 192 to make sure that the resulting physical address is between 0 and ($2^{29}$−1). Note that it is only necessary to test VA(62) for the unmapped spaces to determine whether the space is a full $2^{PSIZE}$ bytes, or just 0.5 GB.

Thus, it is possible to support the 32-bit addressing as a subset of the extended addressing with very little extra hardware.

The TLB for the R4000 processor is a fully associative on-chip TLB containing 40 entries, all of which are checked for a match with the extended virtual address. Each TLB entry maps an even-odd page pair. The page size is controlled on a per-entry basis by a bit mask which specifies which virtual address bits are to be ignored by the TLB. The page size can vary from 4 KB (VA(11..0) bypass TLB) to 16 MB (VA(11..0) bypass TLB and VA(23..12) ignored by TLB).

Table 7 shows the TLB format for the R4000 processor where VSIZE=40 and PSIZE=36. The nominal TLB entry is 256 bits, with room for expansion of VSIZE and PSIZE for future processor implementations. The fields indicated with a "−" are not stored.

Figure 5E:
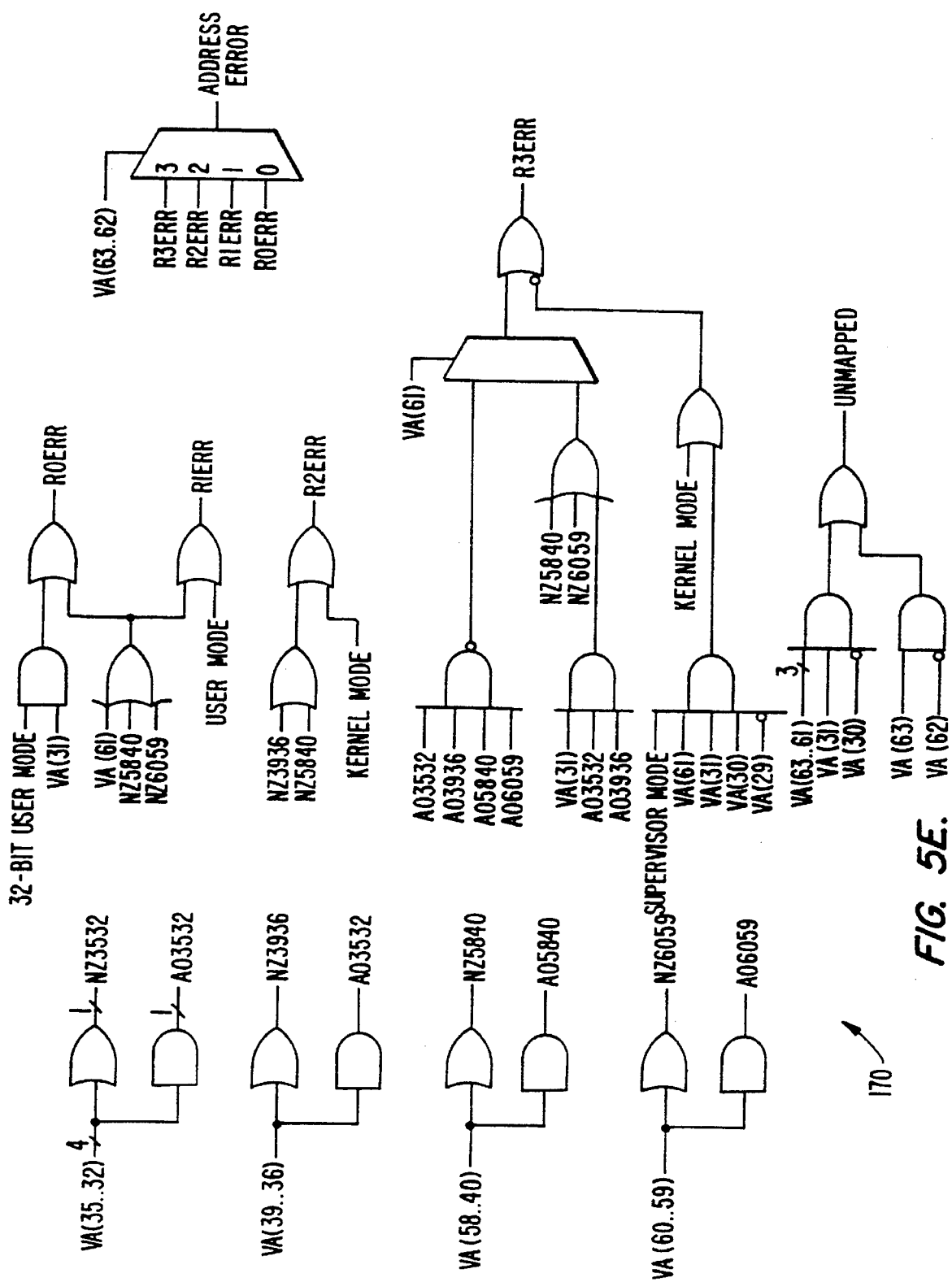
FIG. 5E is a block diagram showing the address testing and control logic.

FIG. 5E is a block diagram showing address test and control logic 170 for the R4000 processor. It is this logic that allows the processor, when it is in a given mode (user, supervisor, kernel) to access certain addresses and not others. Certain references in the figure to VA(36) and VA(35) can be generalized to VA(PSIZE) and VA(PSIZE−1) while references to VA(40) and VA(39) can be generalized to VA(VSIZE) and VA(VSIZE−1). A number of signal names consist of the prefix NZ or AO followed by two 2-digit numbers signifying bit positions. An NZ signal, when true, signifies that the bits in the range are not all 0's; an AO signal, when true, signifies that the bits are all 1's. For example, NZ3532 is asserted if VA(35..32) are not all 0's while AO3532 is asserted if VA(35..32) are all 1's. These signals are used to test that the virtual address satisfies the various constraints discussed above.

Conclusion

In conclusion it can be seen that the present invention provides an elegant technique for extending a computer architecture, maintaining backward compatibility without significant hardware overhead. The extended virtual addressing scheme provides ample address spaces with room to grow in future processor implementations.

While the above is a complete description of a number of embodiments, various modifications, alternatives, and equivalents may be used. For example, the specification describes a processor that implements 64-bit integer arithmetic with 32-bit integer arithmetic as a subset, and 64-bit addressing with 32-bit addressing as a subset. However, there is no need that both extensions be to 64 bits. Indeed, it is possible to extend the integer arithmetic without extending the addressing, or vice versa. Further, while the 32-bit addressing and 64-bit addressing are described as sharing common address generation circuitry, it would be possible to share just the address translation and error checking circuitry and still derive significant benefits.

Therefore the above description and illustrations should not be taken as limiting the scope of the invention, which is defined by the claims.

TABLE 1

ABBREVIATIONS

| | |
|---|---|
| ALU | ALU operation or data operand address generation (cycle) |
| ASID | address space identifier |
| AU | address unit |
| EIC | external interface controller |
| EU | execution unit |
| IF | instruction fetch (cycle) |
| MEM | data memory reference (cycle) |
| MPC | master pipeline control unit |
| ISIZE | offset size in virtual address |
| PA | physical address |
| PC | program counter |
| PFN | page frame number |
| PSIZE | physical address size |
| RF | source operand fetch from register file (cycle) |
| RISC | reduced instruction set computer |
| TLB | translation lookaside buffer |
| VA | virtual address |
| VPN | virtual page number |
| VSIZE | virtual address size |
| WB | write back into register file (cycle) |

TABLE 2

INSTRUCTION FORMATS

| Bits | Field |
|---|---|
| I-type (Immediate) | |
| 31 . . 26 | operation code |
| 25 . . 21 | source register specifier |
| 20 . . 16 | source/destination register specifier or sub-operation code |
| 15 . . 0 | immediate, branch displacement or address displacement |
| J-type (Jump) | |
| 31 . . 26 | operation code |
| 25 . . 0 | target, jump target address |
| R-type (Register) | |
| 31 . . 26 | operation code |
| 25 . . 21 | source register specifier |
| 20 . . 16 | source/destination register specifier or sub-operation code |
| 15 . . 11 | destination register specifier |
| 10 . . 6 | shift amount |
| 5 . . 0 | funcion field |
| Coprocessor | |
| 31 . . 26 | operation code |
| 25 . . 21 | sub-operation code |
| 20 . . 0 | the interpretation of rest of the instruction is coprocessor-specific |

TABLE 3A

LOAD INSTRUCTIONS

| Description | Opcode | Ext | 64-bit |
|---|---|---|---|
| Load Byte | LB | S | |
| Load Byte Unsigned | LBU | Z | |
| Load Halfword | LH | S | |
| Load Halfword Unsigned | LHU | Z | |
| Load Word | LW | S | |

TABLE 3A-continued

LOAD INSTRUCTIONS

| Description | Opcode | Ext | 64-bit |
|---|---|---|---|
| Load Word Left | LWL | S | |
| Load Word Right | LWR | S | |
| Load Linked | LL | S | |
| Load Doubleword | LD | | * |
| Load Doubleword Left | LDL | | * |
| Load Doubleword Right | LDR | | * |
| Load Linked Doubleword | LLD | | * |
| Load Word Unsigned | LWU | Z | * |

TABLE 3B

STORE INSTRUCTIONS

| Description | Opcode | Ext | 64-bit |
|---|---|---|---|
| Store Byte | SB | | |
| Store Halfword | SH | | |
| Store Word | SW | | |
| Store Word Left | SWL | | |
| Store Word Right | SWR | | |
| Store Conditional | SC | | |
| Store Doubleword | SD | | * |
| Store Doubleword Left | SDL | | * |
| Store Doubleword Right | SDR | | * |
| Store Conditional Doubleword | SCD | | * |

TABLE 3C

ALU IMMEDIATE INSTRUCTIONS

| Description | Opcode | Ext | 64-bit |
|---|---|---|---|
| Add Immediate | ADDI | | |
| Add Immediate Unsigned | ADDIU | S | |
| Doubleword Add Immediate | DADDI | | * |
| Doubleword Add Immediate Unsigned | DADDIU | | * |
| Set on Less Than Immediate | SLTI | | |
| Set on Less Than Immediate Insigned | SLTIU | | |
| And Immediate | ANDI | | |
| Or Immediate | ORI | | |
| Exclusive Or Immediate | XORI | | |
| Load Upper Immediate | LUI | S | |

TABLE 3D

BRANCH INSTRUCTIONS

| Description | Opcode | Ext | 64-bit |
|---|---|---|---|
| Branch on Equal | BEQ | | |
| Branch on Not Equal | BNE | | |
| Branch on Less Than or Equal to Zero | BLEZ | | |
| Branch on Greater Than Zero | BGTZ | | |
| Branch on Equal Likely | BEQL | | |
| Branch on Not Equal Likely | BNEL | | |
| Branch on Less Than or Equal to Zero Likely | BLEZL | | |
| Branch on Greater Than Zero Likely | BGTZL | | |
| Branch on Less Than Zero | BLTZ† | | |
| Branch on Greater Than or Equal to Zero | BGEZ† | | |
| Branch on Less Than Zero and Link | BLTZAL† | | |
| Branch on Greater Than or Equal and Link | BGEZAL† | | |
| Branch on Less Than Zero Likely | BLTZL† | | |
| Branch on Greater Than or Equal to Zero Likely | BGEZL† | | |

TABLE 3D-continued

BRANCH INSTRUCTIONS

| Description | Opcode | Ext | 64-bit |
|---|---|---|---|
| Branch on Less Than Zeroand Link Likely and Link Likely | BLTZALL† | | |
| Branch on Greater Than or Equal to Zero and Link Likely | BGEZALL† | | |

†Opcode for these instructions is REGIMM. Specified opcode is actually sub-opcode.

TABLE 4A

ALU 3-OPERAND REGISTER - TYPE INSTRUCTIONS

| Description | Function | Ext | 64-bit |
|---|---|---|---|
| Add | ADD | S | |
| Add Unsigned | ADDU | S | |
| Subtract | SUB | S | |
| Subtract Unsigned | SUBU | S | |
| Doubleword Add | DADD | | * |
| Doubleword Add Unsigned | DADDU | | * |
| Doubleword Subtract | DSUB | | * |
| Doubleword Subtract Unsigned | DSUBU | | * |
| Set on Less Than | SLT | | |
| Set on Less Than Unsigned | SLTU | | |
| And | AND | | |
| Or | OR | | |
| Exclusive Or | XOR | | |
| Nor | NOR | | |

Note: Opcode is SPECIAL. Function is stored in function field.

TABLE 4B

SHIFT INSTRUCTIONS

| Description | Function | Ext | 64-bit |
|---|---|---|---|
| Shift Left Logical | SLL | S | |
| Shift Right Logical | SRL | S | |
| Shift Right Arithmetic | SRA | | |
| Shift Left Logical Variable | SLLV | S | |
| Shift Right Logical Variable | SRLV | S | |
| Shift Right Arithmetic Variable | SRAV | | |
| Doubleword Shift Left Logical | DSLL | | * |
| Doubleword Shift Right Logical | DSRL | | * |
| Doubleword Shift Right Arithmetic | DSRA | | * |
| Doubleword Shift Left Logical Variable | DSLLV | | * |
| Doubleword Shift Right Logical Variable | DSRLV | | * |
| Doubleword Shift Right Arithmetic Variable | DSRAV | | * |
| Doubleword Shift Left Logical + 32 | DSLL32 | | * |
| Doubleword Shift Right Logical + 32 | DSRL32 | | * |
| Doubleword Shift Right Arithmetic + 32 | DSRA32 | | * |

Note: Opcode is SPECIAL. Function is stored in function field.

TABLE 4C

MULTIPLY/DIVIDE INSTRUCTIONS

| Description | Function | Ext | 64-bit |
|---|---|---|---|
| Multiply | MULT | S | |
| Multiply Unsigned | MULTU | S | |
| Divide | DIV | S | |
| Divide Unsigned | DIVU | S | |

TABLE 4C-continued

MULTIPLY/DIVIDE INSTRUCTIONS

| Description | Function | Ext | 64-bit |
|---|---|---|---|
| Doubleword Multiply | DMULT | | * |
| Doubleword Multiply Unsigned | DMULTU | | * |
| Doubleword Divide | DDIV | | * |
| Doubleword Divide Unsigned | DDIVU | | * |
| Move From HI | MFHI | | |
| Move To HI | MTHI | | |
| Move From LO | MFLO | | |
| Move To LO | MTLO | | |

Note: Opcode is SPECIAL. Function is stored in function field.

TABLE 5A

DIRECT JUMP INSTRUCTIONS

| Description | Opcode |
|---|---|
| Jump | J |
| Jump and Link | JAL |

TABLE 5B

INDIRECT JUMP INSTRUCTIONS

| Description | Function |
|---|---|
| Jump to Register | JR |
| Jump and Link Register | JALR |

Note: Opcode is SPECIAL. Function is stored in function Field.

TABLE 6A

Exception Instruction

| Description | Function |
|---|---|
| System Call | SYSCALL |
| Break | BREAK |
| Trap if Greater Than or Equal | TGE |
| Trap if Greater Than or Equal Unsigned | TGEU |
| Trap is Less Than | TLT |
| Trap is Less Than Unsigned | TLTU |
| Trap if Equal | TEQ |
| Trap in Not Equal | TNE |

Note: Opcode is SPECIAL. Function is stored in function field.

TABLE 6B

| | Sub-Opcode |
|---|---|
| Trap if Greater Than or Equal Immediate | TGEI |
| Trap if Greater Than or Equal Unsigned Immediate | GEIU |
| Trap if Less Than Immediate | TLTI |
| Trap if Less Than Unsigned Immediate | TLTIU |
| Trap if Equal Immediate | TEQI |
| Trap if Not Equal Immediate | TNEI |

Note: Opcode is REGIMM.

TABLE 7

TLB FORMAT

| Bits | Field |
|---|---|
| 255 .. 217 | — |
| 216 .. 205 | Comparison mask |
| 204 .. 192 | — |
| 191 .. 190 | Region (00 = user, 01 = supervisor, 11 = kernel) |
| 189 .. 168 | — |
| 167 .. 141 | VPN/2 |
| 140 | Global (if set, ignore ASID in match logic) |
| 139 .. 136 | — |
| 135 .. 128 | ASID |
| 127 .. 94 | — |
| 93 .. 70 | PFN |
| 69 .. 67 | Cache algorithm |
| 66 | Dirty |
| 65 | Valid |
| 64 | 13 |
| 63 .. 0 | correspond to bits(127 .. 64) for second page of pair |

What is claimed is:

1. A computer having registers and data paths that are N bits wide and being capable of supporting an extended architecture defined for N-bit data entities, being backward compatible with an architecture defined for m-bit data entities (where m is less than N) and having a set of instructions, called m-bit instructions, the computer being characterized in that:

a first subset of the m-bit instructions, when redefined to operate on N-bit entities without other modification, inherently operate on N-bit sign-extended entities to produce a result that is sign-extended;

a second subset of the m-bit instructions, when redefined to operate on N-bit entities without other modification, operate on N-bit sign-extended entities to produce a result that is not necessarily sign-extended;

a third subset of the m-bit instructions are load instructions that load data entities of fewer than m bits, and perform an extension of the entities to m bits;

a first subset of the extended architecture instruction set includes the first subset of m-bit instructions, redefined to operate on N-bit entities without other modification;

a second subset of the extended architecture instruction set includes the second subset of m-bit instructions, redefined to operate on N-bit entities and further defined to ensure that bit(N−1) through bit(m) are equal to the value of bit(m−1);

a third subset of the extended architecture instruction set includes the third subset of m-bit instructions, redefined to load data entities of fewer than m bits, and perform the same type of extension to N bits as the third subset of m-bit instructions perform to m bits;

a fourth subset of the extended architecture instruction set includes at least some of the second subset of m-bit instructions, redefined to operate on N-bit entities without other modification.

2. The computer of claim 1, being further characterized in that:

the first subset of the extended architecture instruction set includes logical operation instructions, set instructions, and branch instructions;

the second subset of the extended architecture instruction set includes addition and subtraction instructions, multiplication and division instructions, and shift instructions; and the fourth subset of the extended architecture instruction set includes addition and subtraction instructions, multiplication and division instructions, and shift instructions.

3. A computer having an address unit with data paths that are N bits wide and being capable of supporting an extended architecture with an N-bit virtual address field, the computer being backward compatible with a prior architecture with an m-bit virtual address field, where m is less than N, the prior architecture having a virtual address map wherein kernel and user addresses are distinguished by the value of bit(m-1) of the m-bit virtual address, the computer being characterized in that:

the R most significant bits of the N-bit virtual address define a plurality of regions including a bottom region starting at address 0 and a top region ending at address $2^N-1$;

the extended architecture has a virtual address map that includes a $2^{VSIZE}$-byte user space starting at the bottom of the bottom region, a first kernel space starting at the bottom of one of the regions other than the bottom region, and a second kernel space ending at the top of the top region, the second kernel space being the same size as the prior architecture's kernel space, $2^{VSIZE}$ being greater than the size of the prior architecture's user space but smaller than the size of a region; and the computer includes means for sign-extending m-bit addresses to N bits.

4. The computer of claim 3 wherein VSIZE is greater than m.

5. The computer of claim 3 wherein the first kernel space starts at the bottom of the top region.

6. In a computer system, address logic comprising:

means for generating an N-bit virtual address (VA) with bits being designated VA(N-1) for the most significant bit and VA(0) for the least significant bit, with the R most significant VA bits defining a plurality of regions;

address translation means, responsive to at least a portion of the VA, for generating a physical address on the basis of the VA bits to which it is responsive;

a TLB associated with said address translation means, responsive to at least some of the R most significant VA bits and to a range of VA bits including VA(VSIZE-1) and bits less significant than VA(VSIZE-1), where VSIZE is less than or equal to (N-R), and non-responsive to VA(N-R-1) through VA(VSIZE), for generating a mapped physical address;

means, responsive to at least some of the R most significant VA bits and to VA(N-R-1) through VA(VSIZE), for generating an error signal if for at least one particular region VA(N-R-1) through VA(VSIZE) are not all 0's.

7. The address logic of claim 6 wherein said address translation means includes means, responsive to at least some VA bits defining a range of unmapped addresses, for generating an unmapped physical address having bits taken directly from VA bits without being translated by said TLB.

8. The address logic of claim 6 wherein:

the computer may be in a selected one of a plurality of modes including a user mode and a kernel mode;

one of said plurality of regions is designated the user region;

said address error means specifies an address error when the computer is in user mode and the R most significant VA bits specify a region other than the user region; and said address error means specifies no address error for at least one address in every region when the computer is in kernel mode.

9. The address logic of claim 6 wherein the range of permitted addresses in kernel mode includes addresses having VA(N-1) through VA(m-1) all 1's, where m is less than or equal to VSIZE.

10. In a computer system capable of supporting an extended architecture characterized by an N-bit virtual address (VA) field containing bits VA(N-1) through VA(0), the computer being backward compatible with a prior architecture characterized by an m-bit VA field containing bits VA(m-1) through VA(0), where m is less than N, address logic comprising:

address translation means, responsive to a first high order set of VA bits in the range between VA(N-1) and VA(m) and a first low order set of VA bits in the range between VA(m) and VA(0), for generating a physical address on the basis of the VA bits to which it is responsive;

address error means, responsive to a second high order set of VA bits in the range between VA(N-1) and VA(m) and a second low order set of VA bits in the range between VA(m-1) and VA(0), for generating an address error if the VA is in a range defined to be unavailable;

the first and second high order sets having respective first and second numbers of bits therein;

means, responsive to an N-bit VA, for communicating the first high order and low order sets of bits of the N-bit VA to the address translation means, and for communicating the second high order and low order sets of bits of the N-bit VA to the address error means; and means, responsive to an m-bit VA, for communicating the value of VA(m-1) of the m-bit VA, replicated the first number of times, and the first low order set of bits of the m-bit VA to the address translation means, and for communicating the value of VA(m-1) of the m-bit VA, replicated the second number of times, and the second low order set of bits of the m-bit VA to the address error means.

11. The address logic of claim 10 wherein the first set comprises fewer than all the VA bits in the range between VA(N-1) and VA(m).

12. The address logic of claim 10 wherein the second set comprises all the VA bits in the range between VA(m-1) and VA(0).

13. The address logic of claim 10 wherein the third set comprises all the VA bits in the range between VA(N-1) and VA(m).

14. The address logic of claim 10 wherein the fourth set comprises fewer than all the VA bits in the range between VA(m-1) and VA(0).

* * * * *